US012605922B2

(12) United States Patent
Chu et al.

(10) Patent No.: US 12,605,922 B2
(45) Date of Patent: Apr. 21, 2026

(54) POLYPROPYLENE COMPOSITE MATERIAL HAVING MELTING POINT GRADIENT STRUCTURE, PREPARATION METHOD THEREFOR AND SYSTEM AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Liqiu Chu, Beijing (CN); Fengqian Zhang, Beijing (CN); Yihui Xu, Beijing (CN); Dali Gao, Beijing (CN); Shijun Zhang, Beijing (CN); Jinliang Qiao, Beijing (CN); Dehui Kong, Beijing (CN); Baige Chou, Beijing (CN); Lidong Xia, Beijing (CN); Yiqing Bai, Beijing (CN); Kai Xu, Beijing (CN); Yueming Ren, Beijing (CN); Yachao Zhao, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 225 days.

(21) Appl. No.: 18/707,299

(22) PCT Filed: Nov. 7, 2022

(86) PCT No.: PCT/CN2022/130241
§ 371 (c)(1),
(2) Date: May 3, 2024

(87) PCT Pub. No.: WO2023/078441
PCT Pub. Date: May 11, 2023

(65) Prior Publication Data
US 2025/0326216 A1     Oct. 23, 2025

(30) Foreign Application Priority Data

Nov. 8, 2021     (CN) .......................... 202111312236.5
Nov. 8, 2021     (CN) .......................... 202111312930.7
Nov. 8, 2021     (CN) .......................... 202111312932.6

(51) Int. Cl.
*B32B 27/32*          (2006.01)
*B32B 7/02*           (2019.01)
(Continued)

(52) U.S. Cl.
CPC ................. *B32B 27/32* (2013.01); *B32B 7/02* (2013.01); *B32B 7/12* (2013.01); *B32B 37/10* (2013.01);
(Continued)

(58) Field of Classification Search
CPC ............ B32B 2250/05; B32B 2250/20; B32B 2250/242; B32B 2250/40;
(Continued)

(56) References Cited

U.S. PATENT DOCUMENTS 6,824,863 B1     11/2004   Kitayama et al.
8,021,592 B2     9/2011    Ward et al.
(Continued)

FOREIGN PATENT DOCUMENTS

CN          1529655 A      9/2004
CN          103112224 A    5/2013
(Continued)

*Primary Examiner* — Lawrence D Ferguson
(74) *Attorney, Agent, or Firm* — NKL Law; Allen Xue

(57)          ABSTRACT

A composite material includes a plurality of polypropylene sheet layer unit groups that are sequentially stacked; each polypropylene sheet layer unit group comprises at least one of the same or different polypropylene sheet layer units, the structure of each polypropylene sheet layer unit is $B_iA_iB'_i$; the structure of the polypropylene composite material is . . . i-th group, . . . second group, first group, second group, . . . i-th group, . . . ; the melting point of polypropylene composition $A_i$ is greater than the melting point of polypropylene compositions $B_i$ and $B'_i$; and the average value of the melting points of all outer layers in the i-th (Continued)

group is greater than the average value of the melting points of all outer layers in an (i–1)th group. The polypropylene composite material has a very good tensile property and very good impact resistance, and also has good interlayer stripping strength at a relatively low hot-pressing temperature.

48 Claims, 1 Drawing Sheet

(51) Int. Cl.

| | | |
|---|---|---|
| *B32B 7/12* | (2006.01) | |
| *B32B 37/10* | (2006.01) | |
| *B32B 38/00* | (2006.01) | |

(52) U.S. Cl.
CPC ........ *B32B 38/004* (2013.01); *B32B 2250/05* (2013.01); *B32B 2250/242* (2013.01); *B32B 2307/54* (2013.01); *B32B 2307/558* (2013.01); *B32B 2309/02* (2013.01); *B32B 2309/12* (2013.01)

(58) Field of Classification Search
CPC ........ B32B 2262/0253; B32B 2270/00; B32B 2307/54; B32B 2307/558; B32B 2309/02; B32B 2309/12; B32B 2323/10; B32B 27/08; B32B 27/18; B32B 27/32; B32B 37/06; B32B 37/08; B32B 37/10; B32B 38/004; B32B 5/02; B32B 7/02; B32B 7/027; B32B 7/12
See application file for complete search history.

(56) References Cited

U.S. PATENT DOCUMENTS

| 8,133,537 | B2 | 3/2012 | Nair et al. |
|---|---|---|---|
| 2008/0063846 | A1 | 3/2008 | Loos et al. |
| 2010/0174265 | A1 | 7/2010 | Karsten et al. |
| 2012/0302118 | A1 | 11/2012 | Kasuya et al. |
| 2013/0202864 | A1 | 8/2013 | Akai et al. |
| 2017/0058159 | A1 | 3/2017 | Lee et al. |

FOREIGN PATENT DOCUMENTS

| CN | 105563976 | A | 5/2016 |
|---|---|---|---|
| CN | 105566744 | A | 5/2016 |
| CN | 107471799 | A | 12/2017 |
| CN | 107972343 | A | 5/2018 |
| CN | 108162534 | A | 6/2018 |
| CN | 109968762 | A | 7/2019 |
| JP | 2005319592 | A | 11/2015 |
| RU | 2722160 | C2 | 5/2020 |

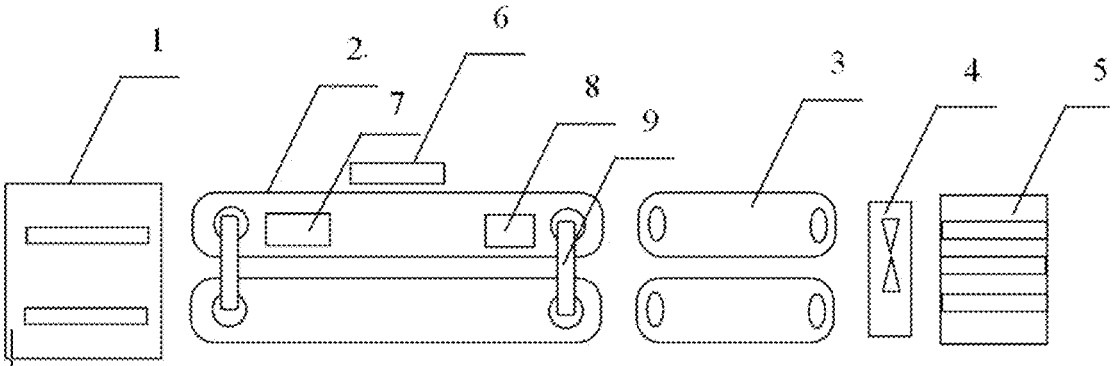

POLYPROPYLENE COMPOSITE MATERIAL HAVING MELTING POINT GRADIENT STRUCTURE, PREPARATION METHOD THEREFOR AND SYSTEM AND USE THEREOF

TECHNICAL FIELD

The present invention relates to a polypropylene composite material, and further, to a polypropylene composite material with a melting point gradient structure and a preparation method therefor and a system and use thereof.

BACKGROUND ART

In recent years, high-strength and high-impact polymer composite materials with easy recycling and light weight, especially self-reinforced polymer composite materials, have become one of the research hot-spots.

The reinforcement phase and matrix of the self-reinforced polymer composite materials are composed of polymers having same type but different morphology, and the reinforcement phase is usually highly oriented fibers or flat ribbons. Most self-reinforced polymer composite materials are prepared by hot-pressing. When the reinforcing phase is hot-pressed at a certain pressure and temperature, the fiber surface of the reinforcing phase melts into a matrix melt. The matrix melt and the surface of the reinforcement phase co-crystallize during melting, thus providing sufficient interfacial bonding strength.

For example, in U.S. Pat. No. 8,021,592B2, melt-spun oriented polyolefin fibers with a weight-average molecular weight of less than 250,000 are weaved and then hot-pressed, and the surface layer of the polyolefin fabric is partly melted and bonded by using a specific high temperature, pressure and cooling time to prepare a polyolefin sheet. The preparation method is sensitive to hot-pressing temperature, and the required hot-pressing temperature is high. The oriented fibers in the prepared composite polyolefin fibers after hot-pressing produce relatively large disorientation, the mechanical strength significantly drops, and the self-reinforcing effect needs to be further improved.

In order to widen the hot-pressing window and reduce the hot-pressing pressure, U.S. Pat. No. 8,133,537B2 hot-presses three layers of polyolefin fibers with different melting points to obtain a polyolefin composite material, in which the melting temperature of the first and second layers of polyolefin is lower than that of the core layer, it is noted that the viscosity of second polymer is not greater than about 10% of the viscosity of the first polymer as measured at 170° C. However, the impact strength and interlayer peel strength of the hot-pressed composite material produced by this method are small, and it is impossible to obtain a hot-pressed composite material having both good mechanical properties and higher interlayer peel strength.

SUMMARY OF THE INVENTION

The purpose of the present invention is to overcome the technical problems that the existing polypropylene composite materials are difficult to simultaneously have a wider processing temperature, stronger mechanical properties and a higher interlayer peel strength. The present invention provides a polypropylene composite material with a melting point gradient structure and a preparation method therefor, and a system and use thereof through the design of a melting point gradient structure of the stacked polypropylene. The preparation method can reduce hot-pressing operation time, while improving production efficiency, and reducing production energy consumption. The polypropylene composite material obtained by this method has excellent mechanical properties and a good interlayer peel strength at the same time.

It is the first objective of the present invention to provide a polypropylene composite material, comprising a plurality of polypropylene sheet layer unit groups that are sequentially stacked; each polypropylene sheet layer unit group comprises at least one same or different polypropylene sheet layer units, and each polypropylene sheet layer unit comprises a core layer $A_i$ and outer layers $B_i$ and $B'_i$ located on both sides of the core layer $A_i$, with a structure of $B_iA_iB'_i$; the structure of the polypropylene composite material is group n, . . . group i, . . . group 2, group 1, group 2, . . . group i, . . . group n, from bottom to top, the total number of the stacked groups of polypropylene sheet layer unit groups is $2n-1$; i and n are both integers not less than 2, and $i \leq n$; wherein, the core layer $A_i$ in the polypropylene sheet layer unit contains the polypropylene composition $A_i$, the outer layer $B_i$ is the same as or different from the outer layer $B'_i$, the outer layer $B_i$ contains the polypropylene composition $B_i$, and the outer layer $B'_i$ contains the polypropylene composition $B'_i$, the melting point of the polypropylene composition $A_i$ is greater than the melting point of the polypropylene composition $B_1$ and of the polypropylene composition $B'_i$; the average value of the melting points of all outer layers in group i is greater than the average value of the melting points of all outer layers in group i−1.

According to the present invention, in the structure of the polypropylene composite material, group i on the top may be same as or different from group i on the bottom.

In a preferred embodiment of the present invention, the difference between the melting point of polypropylene composition $A_i$ and the melting point of polypropylene composition $B_i$, the difference between the melting point of polypropylene composition $A_i$ and the melting point of polypropylene composition $B'_i$ are each greater than or equal to 5° C., preferably greater than or equal to 10° C., more preferably greater than or equal to 20° C.; more preferably is 20-60° C.

According to the present invention, the core layer in each polypropylene sheet layer unit may be the same material or different materials, and the present invention is not particularly limited on this. As long as the melting point of $A_i$ is higher than the melting point of the polypropylene composition $B_i$, polypropylene composition $B'_i$, better technical effects can be achieved.

In a preferred embodiment of the present invention, the differences between the average value of the melting points of all outer layers in group i and the average value of the melting points of all outer layers in group i−1, same or different, are each 1-40° C., preferably 1-10° C., more preferably 1-5° C.

According to the present invention, the total number of the stacked groups of polypropylene sheet layer unit groups is $2n-1$, and the present invention has a wide selection range for the total number of the stacked groups of polypropylene sheet layer unit groups. In a preferred embodiment of the present invention, it is preferably $2 \leq n \leq 100$, more preferably, $2 \leq n \leq 50$, further preferably, $2 \leq n \leq 30$.

According to the present invention, the number of polypropylene sheet layer units comprised in each polypropylene sheet layer unit group can be selected in a wide range. In a preferred embodiment of the present invention, each polypropylene sheet layer unit group, independently comprises 1 to 10, preferably 1 to 5, more preferably 1 to 3 same or different polypropylene sheet layer units, more preferably 1 polypropylene sheet layer unit. Preferably, the number of polypropylene sheet layer units comprised in each polypropylene sheet layer unit group is the same.

Preferably but not necessarily, the melting point of any outer layer in each group is within $\pm 10°$ C., within $\pm 5°$ C., preferably within $\pm 3°$ C., more preferably $\pm 1°$ C. of the average of the melting points of all outer layers in the group.

In an embodiment where each polypropylene sheet layer unit group only comprises 1 polypropylene sheet layer unit, for example, the structure of the polypropylene composite material can be $B_n A_n B'_n \ldots B_i A_i B'_i \ldots B_2 A_2 B'_2, B_i A_i B'_i, B_2 A_2 B'_2 \ldots B_i A_i B'_i \ldots B_n A_n B'_n$, from bottom to top, the total number of the stacked units of polypropylene sheet layer unit is $2n-1$; i and n are both integers not less than 2, and i≤n.

In an embodiment where each polypropylene sheet layer unit group comprises 2 or more polypropylene sheet layer units, for example, the structure of the polypropylene sheet layer unit group i is $B_{i1} A_{i1} B'_{i1}, B_{i2} A_{i2} B'_{i2} \ldots B_{ip} A_{ip} B'_{ip}$, the structure of the polypropylene composite material may be $(B_{n1} A_{n1} B'_{n1}, B_{n2} A_{n2} B'_{n2} \ldots B_{nq} A_{nq} B'_{nq}) \ldots (B_{i1} A_{i1} B'_{i1}, B_{i2} A_{i2} B'_{i2} \ldots B_{ip} A_{ip} B'_{ip}) \ldots (B_{21} A_{21} B'_{21}, B_{22} A_{22} B'_{22} \ldots B_{2k} A_{2k} B'_{2k})(B_{11} A_{11} B'_{11}, B_{12} A_{12} B'_{12} \ldots B_{1j} A_{1j} B'_{1j}) (B_{21} A_{21} B'_{21}, B_{22} A_{22} B'_{22} \ldots B_{2k} A_{2k} B'_{2k}) \ldots (B_{i1} A_{i1} B'_{i1}, B_{i2} A_{i2} B'_{i2} \ldots B_{ip} A_{ip} B'_{ip}) \ldots (B_{n1} A_{n1} B'_{n1}, B_{n2} A_{n2} B'_{n2} \ldots B_{nq} A_{nq} B'_{nq})$, from bottom to top, the total number of the stacked units of polypropylene sheet layer unit is $j+2k+ \ldots 2p+ \ldots 2q$; j, k, p, q, each independently, are integers not less than 2, preferably, 2 to 10, more preferably, 2 to 5, more preferably, integers of 2 to 3.

In a preferred embodiment of the present invention, the polypropylene sheet layer unit also comprises intermediate layers $C_i$ and $C'_i$, and the structure of the polypropylene sheet layer unit is $B_i C_i A_i C'_i B'_i$; the intermediate layer $C_i$ is the same as or different from the intermediate layer $C'_i$, the intermediate layer $C_i$ contains polypropylene composition $C_i$, and the intermediate layer $C'_i$ contains polypropylene composition $C'_i$; the melting point of the polypropylene composition $A_i$ is greater than the melting point of the polypropylene composition $C_i$ and of the polypropylene composition $C'_i$.

According to the present invention, the thickness percentage of the core layer $A_i$ in each polypropylene sheet layer unit can be selected in a wide range. In a preferred embodiment of the present invention, the thickness of the core layer $A_i$ in each polypropylene sheet layer unit accounts for 51%-89% of the total thickness, preferably 71%-89%, more preferably 71%-80%, based on the total thickness of each polypropylene sheet layer unit. The thicknesses of the outer layers $B_i$ and $B'_i$ located on both sides of the core layer $A_i$ may be the same or different, preferably the same. The thicknesses of the intermediate layers $C_i$ and $C'_i$ located on both sides of the core layer $A_i$ may be the same or different, preferably the same.

The thickness of each polypropylene sheet layer unit can be selected in a wide range. In a preferred embodiment of the present invention, the thickness of each polypropylene sheet layer unit is 10-1000 μm, preferably 30-500 μm, more preferably 50-300 μm.

According to the present invention, the thickness of core layer $A_i$, outer layers $B_i$, $B'_i$, intermediate layers $C_i$, $C'_i$ can be controlled by the extruder melt pump during processing.

According to the present invention, polypropylene composition $A_i$ comprises, but not limited to, one or more of polypropylene homopolymer, polypropylene random copolymer and polypropylene impact copolymer; polypropylene compositions $B_i$, $B'_i$ each comprise, but not limited to, one or more of polypropylene homopolymer, polypropylene random copolymer and polypropylene impact copolymer, and optional thermal bonding enhancer $y_i$; polypropylene compositions $C_i$, $C'_i$ each comprise, but not limited to, one or more of polypropylene homopolymer, polypropylene random copolymer and polypropylene impact copolymer, and optional thermal bonding enhancer $z_i$.

According to the present invention, the polypropylene composition $A_i$ can be selected in a wide range. In a preferred embodiment of the present invention, the polypropylene composition $A_i$ comprises one or more of polypropylene homopolymer, polypropylene random copolymer and polypropylene impact copolymer.

According to the present invention, the polypropylene composition $B_i$ and $B'_i$ each comprise one or more of polypropylene homopolymer, polypropylene random copolymer and polypropylene impact copolymer; preferably, the polypropylene composition $B_i$ and/or polypropylene composition $B'_i$ also contain a thermal bonding enhancer $y_i$.

According to the present invention, the polypropylene composition $C_i$ and $C'_i$ each comprise one or more of polypropylene homopolymer, polypropylene random copolymer and polypropylene impact copolymer; preferably, the polypropylene composition $C_i$ and/or polypropylene composition $C'_i$ also contain a thermal bonding enhancer $z_i$.

In a more preferred embodiment of the present invention, polypropylene composition Ai comprises polypropylene homopolymer $a_i$, and polypropylene impact copolymer $b_i$; in a further more preferred embodiment of the present invention, the polypropylene composition $A_i$ comprises 50-99 wt % of polypropylene homopolymer $a_i$, 1-50 wt % of polypropylene impact copolymer $b_i$; more preferably, the polypropylene composition $A_i$ comprises 70-90 wt % of polypropylene homopolymer $a_i$, 10-30 wt % of polypropylene impact copolymer $b_i$, based on the total weight of the polypropylene composition $A_i$.

In a more preferred embodiment of the present invention, the polypropylene composition $B_i$, the polypropylene composition $B'_i$ each comprise polypropylene random copolymer $x_i$ and a thermal bonding enhancer $y_i$; preferably, the polypropylene composition $B_i$, the polypropylene composition $B'_i$ each comprise 70-99 wt % of polypropylene random copolymer $x_i$, 1-30 wt % of thermal bonding enhancer $y_i$; preferably, the polypropylene composition $B_i$ comprises 80-90 wt % of polypropylene random copolymer $x_i$, 10-20 wt % of thermal bonding enhancer $y_i$, based on the total weight of each of the polypropylene composition $B_i$, the polypropylene composition $B'_i$.

In a more preferred embodiment of the present invention, the polypropylene composition $C_i$, the polypropylene composition $C'_i$ each comprise polypropylene random copolymer $\beta_i$ and polypropylene homopolymer $\gamma_i$ and a thermal bonding enhancer $z_i$; preferably, the polypropylene composition $C_i$, the polypropylene composition $C'_i$ each comprise 30-60 wt % of thermal bonding enhancer $z_i$, 35-55 wt % of polypropylene random copolymer $\beta_i$ and 5-15 wt % of polypropylene homopolymer $\gamma_i$; more preferably, the polypropylene composition $C_i$, the polypropylene composition $C'_i$ each comprise 35-55 wt % of thermal bonding enhancer $z_i$, 40-55 wt % of polypropylene random copolymer $\beta_i$ and 5-10 wt % of polypropylene homopolymer $\gamma_i$, based on the total weight of each of the polypropylene composition $C_i$, the polypropylene composition $C'_i$.

According to the present invention, the polypropylene homopolymer $a_i$ can be selected in a wide range. In a preferred embodiment of the present invention, the polypropylene homopolymer $a_i$ has a melting point of 150-170° C., preferably 160-170° C.; and/or an isotacticity (mm) not less than 96%, preferably not less than 97%, more preferably not less than 98%.

According to the present invention, the melt flow rate of the polypropylene homopolymer $a_i$ can be selected in a wide range, preferably, the polypropylene homopolymer $a_i$ has a melt flow rate at 230° C., 2.16 kg load of 0.5-50 g/10 min, preferably of 1-20 g/10 min, more preferably of 2.5-18 g/10 min.

According to the present invention, "and/or" refers to either a single condition or a combination of two conditions.

According to the present invention, the polypropylene impact copolymer $b_i$ can be selected in a wide range. In a preferred embodiment of the present invention, the polypropylene impact copolymer $b_i$ has a melting point of 150-170° C., the monomer copolymerized with propylene in the polypropylene impact copolymer is ethylene or butene, preferably butene; and/or the polypropylene impact copolymer has an Izod impact strength no less than 20 KJ/m² (23° C.).

According to the present invention, the melt flow rate of the polypropylene impact copolymer $b_i$ can be selected in a wide range, preferably, the polypropylene impact copolymer $b_i$ has a melt flow rate at 230° C., 2.16 kg load of 0.5-50 g/10 min, preferably of 1-20 g/10 min, more preferably of 2.5-18 g/10 min.

Through the research conducted by the present inventors, it has been found that when the melt mass flow rate and the polymer compositional ratio of the raw materials used in the polypropylene composition $A_i$ are within the preferred range, the polypropylene impact copolymer $b_i$ in the composition can better absorb impact energy, meeting the requirements of impact performance, so that the sheet has good impact performance. At the same time, because the macromolecular segments in the polypropylene homopolymer $a_i$ are relatively regular, crystallization occurs during the preparation of the sheet, so that the sheet also has good tensile properties.

In a preferred embodiment of the present invention, the polypropylene composition $A_i$ also comprises a β-nucleating agent; preferably, the β-nucleating agent is selected from at least one of polycyclic aromatic hydrocarbons, Group IIA two-component complexes, aromatic diamides, rare earth compounds and cyclic dicarboxylate nucleating agents.

According to the present invention, the amount of β-nucleating agent can be selected in a wide range, preferably, the content of the β-nucleating agent in the polypropylene composition $A_i$ is 0.01-0.5 parts by weight, based on 100 parts by weight of the total amount of the polypropylene composition $A_i$. Specifically, for example, the content of the β-nucleating agent can be 0.01, 0.05, 0.1, 0.2, 0.3, 0.4, 0.5 parts by weight.

In a preferred embodiment of the present invention, the melting point of the polypropylene random copolymer $x_i$ is 110-150° C., preferably 120-140° C., preferably, the average value of the melting points of all polypropylene random copolymers in group i is greater than the average value of the melting points of all polypropylene random copolymers in group i−1, preferably, a difference in melting points therebetween is 1-40° C., more preferably 1-10° C., most preferably 1-5° C.; preferably, the polypropylene random copolymer $x_i$ is a copolymer of propylene with ethylene and/or butene, preferably an ethylene-propylene-butene terpolymer and/or propylene-ethylene bipolymer.

According to the present invention, the melt flow rate of the polypropylene random copolymer $x_i$ can be selected in a wide range, preferably, the melt flow rate at 230° C., 2.16 kg load is 0.5-50 g/10 min, preferably 1-20 g/10 min, more preferably 3-18 g/10 min. The polypropylene random copolymer $x_i$ has a molecular weight distribution Mw/Mn of 5-12, preferably 7-10.

In a preferred embodiment of the present invention, the thermal bonding enhancer $y_i$ has a melting point or viscous flow temperature of 70-110° C. A,,d/or, the thermal bonding enhancer $y_i$ is selected from one or more of polyolefin elastomer, ethylene-propylene-diene-terpolymer rubber, SEBS, SBS, EVA, petroleum resin; preferably, the thermal bonding enhancer $y_i$ is a polyolefin elastomer and/or petroleum resin.

In a preferred embodiment of the present invention, the polyolefin elastomer is preferably an elastomer of ethylene copolymerized with propylene and/or α-olefin, the α-olefin is preferably a C4-C12 α-olefin, more preferably 1-butene and/or 1-octene; and/or the petroleum resin is C5 and/or C9 hydrogenated petroleum resin with a softening point of 100-150° C.; preferably is cyclopentadiene type resin.

According to the present invention, the melt flow rate of the thermal bonding enhancer $y_i$ can be selected in a wide range, preferably, the thermal bonding enhancer $y_i$ has a melt flow rate at 190° C., 2.16 kg load of 0.5-50 g/10 min, preferably of 1-20 g/10 min, preferably of 1-18 g/10 min, more preferably of 3-18 g/10 min.

Through the research conducted by the present inventors, it has been found that when the respective polymer compositional ratios of the polypropylene composition $B_i$ and the polypropylene composition $B'_i$ are within the above preferred ranges, the low melting point polypropylene random copolymer $x_i$ and thermal bonding enhancer $y_i$ in the composition can significantly reduce the hot-pressing temperature and widen the hot-pressing temperature window. Additionally, the thermal bonding enhancer $y_i$ provides good adhesive properties for the sheet, further improving the interlayer peel strength.

Through the research conducted by the present inventors, it has been found that when the respective polymer compositional ratios of the polypropylene composition $A_i$ and the polypropylene composition $B_i$ and the polypropylene composition $B'_i$ and the thickness distribution of the polymer composition $A_i$ are within the above preferred ranges, it is possible to further enable a smoother preparation process of the sheet, which in turn enables the sheet to have further better uniformity, tensile strength, impact property, and interlayer peel strength.

According to the present invention, when the polypropylene sheet layer unit has a sheet structure of $B_iC_iA_iC'_iB'_i$, the thickness percentage of each layer can be selected in a wide range. In a preferred embodiment of the present invention, the thickness of the core layer $A_i$ accounts for 51%-89% of the total thickness, preferably 71%-89%; the thickness of the intermediate layers $C_i$, $C'_i$ accounts for 6%-20% of the total thickness, preferably 6%-15%; the thickness of the outer layers $B_i$, $B'_i$ accounts for 5%-30% of the total thickness, preferably 5%-15%, based on the total thickness of the polypropylene sheet layer unit.

According to the present invention, the polypropylene random copolymer $β_i$ can be selected in a wide range. In a preferred embodiment of the present invention, the polypropylene random copolymer $β_i$ has a melting point of 110-150°

C., preferably 120-140° C.; and/or the polypropylene random copolymer $\beta_i$ has a melt flow rate at 230° C., 2.16 kg load of 0.5-50 g/10 min, preferably of 1-20 g/10 min, more preferably of 3-18 g/10 min; and/or the polypropylene random copolymer $\beta_i$ has a molecular weight distribution Mw/Mn of 5-12, preferably 7-10. Preferably, the polypropylene random copolymer $\beta_i$ is a copolymer of propylene with ethylene and/or butene, preferably an ethylene-propylene-butene terpolymer and/or propylene-ethylene bipolymer.

According to the present invention, the polypropylene homopolymer $\gamma_i$ can be selected in a wide range. In a preferred embodiment of the present invention, the polypropylene homopolymer $\gamma_i$ has a melting point of 150-170° C., preferably 160-170° C.; and/or the polypropylene homopolymer $\gamma_i$ has a melt flow rate at 230° C., 2.16 kg load of 0.5-50 g/10 min, preferably of 1-20 g/10 min, more preferably of 2.5-18 g/10 min; and/or the polypropylene homopolymer $\gamma_i$ has an isotacticity (mm) of not less than 96%.

In a preferred embodiment of the present invention, the thermal bonding enhancer $z_i$ has a melting point or viscous flow temperature of 70-110° C. A,,d/or, the thermal bonding enhancer $z_i$ is selected from one or more of polyolefin elastomer, ethylene-propylene-diene-terpolymer rubber, SEBS, SBS, EVA, petroleum resin; preferably, the thermal bonding enhancer $z_i$ is a polyolefin elastomer and/or petroleum resin.

In a preferred embodiment of the present invention, the polyolefin elastomer is preferably an elastomer of ethylene copolymerized with propylene and/or $\alpha$-olefin, the $\alpha$-olefin is preferably a C4-C12 $\alpha$-olefin, more preferably 1-butene and/or 1-octene; and/or the petroleum resin is C5 and/or C9 hydrogenated petroleum resin with a softening point of 100-150° C.; preferably is cyclopentadiene type resin.

According to the present invention, the melt flow rate of the thermal bonding enhancer $z_i$ can be selected in a wide range, preferably, the thermal bonding enhancer $z_i$ has a melt flow rate at 190° C., 2.16 kg load of 0.5-50 g/10 min, preferably 1-20 g/10 min, preferably 1-18 g/10 min, more preferably 3-18 g/10 min.

In a preferred embodiment of the present invention, the polypropylene random copolymer $x_i$, and the polypropylene random copolymer $\beta_i$ have; a difference in melting points less than 10° C., preferably less than 5° C., more preferably less than 3° C.; and/or a difference in melt flow rates at 230° C., 2.16 kg load less than 10 g/10 min, preferably less than 5 g/10 min, more preferably less than 3 g/10 min; and/or a difference in molecular weight distributions less than 3, preferably less than 2, more preferably less than 1. Further preferably, the polypropylene random copolymer $x_i$ and the polypropylene random copolymer $\beta_i$ are the same.

In a preferred embodiment of the present invention, the polypropylene homopolymer $a_i$, and the polypropylene homopolymer $\gamma_i$ have: a difference in melting points less than 10° C., preferably less than 5° C., more preferably less than 3° C.; and/or a difference in melt flow rates at 230° C., 2.16 kg load less than 10 g/10 min, preferably less than 5 g/10 min, more preferably less than 3 g/10 min; and/or a difference in isotacticities (mm) less than 3%, preferably less than 2%, more preferably less than 1%; further preferably, the polypropylene homopolymer $a_i$ and the polypropylene homopolymer $\gamma_i$ are the same.

In a preferred embodiment of the present invention, the thermal bonding enhancer $y_i$, and the thermal bonding enhancer $z_i$ have: a difference in melting points or viscous flow temperature of less than 10° C., preferably less than 5° C., more preferably less than 3° C.; and/or a difference in melt flow rates at 190° C., 2.16 kg load less than 10 g/10 min, preferably less than 5 g/10 min, more preferably less than 3 g/10 min. Further preferably, the thermal bonding enhancer $y_i$ and the thermal bonding enhancer $z_i$ are the same.

Through the research conducted by the present inventors, it has been found that when the melt mass flow rates and polymer compositional ratios of the polypropylene compositions $C_i$, $C'_i$ and the polypropylene compositions $B_i$, $B'_i$ are within the above preferred ranges, the low melting point polypropylene random copolymer and thermal bonding enhancer in the composition can significantly reduce the hot-pressing temperature and widen the hot-pressing temperature window, and the thermal bonding enhancer provides good adhesive properties for the sheet, further improving the interlayer peel strength.

In a preferred embodiment of the present invention, the melting point of polypropylene composition $A_i$ is greater than the melting point of the polypropylene compositions $C_i$, $C'_i$ and the polypropylene compositions $B_i$, $B'_i$, preferably the temperature difference between the respective melting points is greater than or equal to 5° C., preferably greater than or equal to 10° C., more preferably greater than or equal to 20° C. Preferably, the melting point of the polypropylene homopolymer $a_i$ in the components of the polypropylene composition $A_i$ is greater than the melting point of the polypropylene random copolymer $\beta_i$ in the polypropylene compositions $C_i$, $C'_i$ and the melting point of the polypropylene random copolymer $x_i$ in the polypropylene compositions $B_i$, $B'_i$, and the temperature difference between the respective melting points is greater than or equal to 10° C.

According to the present invention, there is no special limitation on a difference in melting points between polypropylene compositions $C_i$, $C'_i$ and polypropylene compositions $B_i$, $B'_i$ in the present invention.

Through the research conducted by the present inventors, it has been found that when the melt mass flow rates, differences in melting points, polymer compositional ratios and polymer composition thickness distributions of the polypropylene composition $A_i$, the polypropylene compositions $C_i$, $C'_i$ and compositions $B_i$, $B'_i$ are within the above preferred ranges, it is possible to enable a smoother preparation process of the sheet, which in turn enables the sheet to have further better uniformity, tensile strength, impact property, and interlayer peel strength.

According to the present invention, the sheet structure of $B_iC_iA_iC'_iB'_i$ of the polypropylene sheet layer unit can be obtained by co-extrusion of components comprising polypropylene composition $A_i$, polypropylene compositions $C_i$, $C'_i$, and polypropylene compositions $B_i$, $B'_i$.

According to the present invention, the polypropylene sheet can be a film, also can be of a certain thickness. In the present invention, the polypropylene film is one form of the polypropylene sheet.

According to the present invention, the polypropylene sheet layer unit is a polypropylene sheet and/or polypropylene fabric; the polypropylene sheet layer unit may be a polypropylene sheet and may also be polypropylene fabric. In a preferred embodiment of the present invention, the polypropylene sheet layer unit is a polypropylene sheet or polypropylene fabric.

In a preferred embodiment of the present invention, the polypropylene sheet is prepared by co-extruding the components comprising polypropylene composition $A_i$, polypropylene composition $B_i$, polypropylene composition $B'_i$, optional polypropylene composition $C_i$, optional polypropylene composition $C'_i$.

In a preferred embodiment of the present invention, the polypropylene fabric is prepared by the following method: firstly, co-extruding the components comprising polypropylene composition $A_i$, polypropylene composition $B_i$, polypropylene composition $B'_i$, optional polypropylene composition $C_i$, optional polypropylene composition $C'_i$ to obtain a polypropylene sheet, and then weaving the polypropylene sheet to obtain the polypropylene fabric; preferably, the polypropylene fabric has a three-dimensional structure of plain weave, twill weave and/or satin weave.

According to the present invention, preferably, the various polypropylene sheet layer units are connected by hot-pressing bonding.

In a preferred embodiment of the present invention, the polypropylene composite material has at least one of the following features:

a tensile strength in machine direction of ≥160 MPa, preferably of ≥180 MPa; an interlayer peel strength of ≥1.3 N/mm, preferably of ≥1.5 N/mm.

The tensile strength in machine direction is measured in accordance with a method specified in GB/T1040.1-2018, the interlayer peel strength is measured in accordance with a method specified in GB/T2358-98. The corresponding samples in the above two tests are standard sample required in the above testing standards.

When the polypropylene composite material is obtained by hot-pressing and fusing of 5 polypropylene sheet layer units and the thickness of the polypropylene composite material is about 390 μm, it has a drop impact strength of ≥42J, preferably ≥45J.

The drop impact strength is determined in accordance with a method specified in GB/T14153-1993, and the thickness of the sample is the thickness of the prepared product.

It is the second objective of the present invention to provide a method for preparing the polypropylene composite material as described above, comprising the steps of: sequentially stacking 2n−1 polypropylene sheet layer unit groups in a sequence of group n, . . . group i, . . . group 2, group 1, group 2, . . . group i, . . . group n, and then performing hot-pressing and fusing.

In an embodiment where each polypropylene sheet layer unit group only comprises 1 polypropylene sheet layer unit, the preparation method comprises the steps of: sequentially stacking 2n−1 polypropylene sheet layer units with the structure of $B_iA_iB'_i$ according to the order of $B_nA_nB'_n$ . . . $B_iA_iB'_i$ . . . $B_2A_2B'_2$, $B_iA_iB'_i$, $B_2A_2B'_2$ . . . $B_iA_iB'_i$ . . . $B_nA_nB'_n$, and then performing hot-pressing and fusing.

In an embodiment where each polypropylene sheet layer unit group comprises 2 or more polypropylene sheet layer units, the preparation method comprises the steps of: sequentially stacking the polypropylene sheet layer units of each polypropylene sheet layer unit group, then sequentially stacking 2n−1 polypropylene sheet layer unit groups in a sequence of group n, . . . group i, . . . group 2, group 1, group 2, . . . group i, . . . group n, and then performing hot-pressing and fusing.

In a preferred embodiment of the present invention, the preparation method comprises the following steps:

(1) polypropylene composition $A_i$, polypropylene composition $B_i$ and polypropylene composition $B'_i$, optional polypropylene composition $C_i$, optional polypropylene composition $C'_i$ are co-extrusion molded, cast or calendered, and stretched according to $B_iA_iB'_i$ structure or $B_iC_iA_iC'_iB'_i$ structure to obtain a polypropylene sheet;

(2) optionally, the polypropylene sheet is divided and cut, and then weaved to obtain a polypropylene fabric of $B_iA_iB'_i$ structure or $B_iC_iA_iC'_iB'_i$ structure;

(3) the polypropylene sheet and/or the polypropylene fabric are sequentially stacked, hot-pressed and fused, and then cooled and shaped to form the polypropylene composite material.

In a preferred embodiment of the present invention, in the step (1), the preparation of the polypropylene composition $A_i$ comprises melt blending the raw materials such as the components comprising at least one of the polypropylene homopolymer, polypropylene random copolymer and polypropylene impact copolymer. The melt-blending conditions and equipment for the polypropylene composition $A_i$ all adopt the melt-blending conditions and equipment for the polyolefins in the prior art, preferably, the melting temperature is 190-240° C., and the equipment is preferably a twin-screw extruder.

In a preferred embodiment of the present invention, in the step (1), the preparation of the polypropylene compositions $B_i$, $B'_i$ comprises melt blending the raw materials such as the components comprising at least one of the polypropylene homopolymer, polypropylene random copolymer and polypropylene impact copolymer; the melt-blending conditions and equipment for the polypropylene compositions $B_i$, $B'_i$ all adopt the melt-blending conditions and equipment for the polyolefins in the prior art, preferably, the melting temperature is 190-240° C., and the equipment is preferably a twin-screw extruder.

In a preferred embodiment of the present invention, in the step (1), the preparation of the polypropylene compositions $C_i$, $C'_i$ comprises melt blending the raw materials such as the components comprising at least one of the polypropylene homopolymer, polypropylene random copolymer and polypropylene impact copolymer; the melt-blending conditions and equipment for the polypropylene compositions $C_i$, $C'_i$ all adopt the melt-blending conditions and equipment for the polyolefin in the prior art, preferably, the melting temperature is 190-240° C., and the equipment is preferably a twin-screw extruder.

In a preferred embodiment of the present invention, in the step (1), the temperatures of the co-extrusion molding and casting are independently selected from 200-240° C.; and/or the temperature of the calendering roller is 50-70° C.

In a preferred embodiment of the present invention, the condition of the stretching comprises: the temperature of the stretching of 90-165° C., preferably 90-140° C., more preferably 90-119° C.; and/or the stretching ratio of 1-15, preferably of 2-9.

In a preferred embodiment of the present invention, the polypropylene sheet obtained in step (1) has a width of 2-5 mm.

In a preferred embodiment of the present invention, in the step (3), the hot-pressing condition comprises: a hot-pressing temperature of 115-170° C., preferably 115-159° C., more preferably 140-159° C.; a hot-pressing pressure of 2-10 MPa, a preheating time of 5-600s, a hot-pressing time of 1-600s, preferably 10-500s.

In a preferred embodiment of the present invention, the pressure for cooling and shaping is 2-8 MPa and the cooling time is 30s-700s.

In a preferred embodiment of the present invention, the stacked adjacent polypropylene fabrics are placed at 0-90 degrees with respect to each other along their respective warp directions; and/or the stacked adjacent polypropylene sheets are placed at 0-90 degrees with respect to each other along their respective machine directions, the machine direction is the stretching direction (MD).

In a more preferred embodiment of the present invention, the method for preparing the polypropylene composite material comprises the following steps:

step a: polypropylene composition $A_i$, polypropylene composition $B_i$, polypropylene composition $B'_i$, optional polypropylene composition $C_i$, optional polypropylene composition $C'_i$ are co-extrusion molded, and cast or calendered according to $B_iA_iB'_i$ structure or $B_iC_iA_iC'_iB'_i$ structure to obtain a co-extruded polypropylene sheet; preferably, the temperature of co-extruding, casting or calendering is 200-230° C., and the temperature of the calendering roller is 50-70° C.;

step b: the co-extruded polypropylene sheet is solid phase stretched at a certain temperature to obtain a stretched polypropylene film or stretched polypropylene sheet; preferably the temperature of the stretching is 90-165° C., preferably 90-140° C., more preferably 90-119° C., and the stretching ratio is 1-15;

step c: the stretched polypropylene film or stretched polypropylene sheet is divided and cut to prepare polypropylene ribbons, weaving the ribbons to obtain a polypropylene fabric; preferably, the width of the polypropylene ribbon is 2-5 mm, and the structure of the polypropylene fabric comprises but not limited to plain weaved, twill weaved, satin weaved and/or other three-dimensional polypropylene fabrics;

step d: the stretched polypropylene film, sheet or fabric are sequentially stacked in a sequence of group n . . . group i . . . group 2, group 1, group 2 . . . group i . . . group n, from bottom to top, the total number of the stacked groups is 2n−1, where n>=2. The polypropylene sheets or fabrics are hot-pressed and fused, and then cooled and shaped to make the polypropylene composite material; the hot-pressing temperature is preferably 110-180° C., preferably 115-170° C., and more preferably 130-160° C.; hot-pressing pressure is 2-10 MPa, the preheating time is 5-600s, the hot-pressing time is 1-600s, preferably 10-500s, the cooling pressure is 2-8 MPa, and the cooling time is 30s-700s; preferably, the polypropylene sheets in the polypropylene composite material are placed at 0-90 degrees with respect to each other along their respective machine directions, and the polypropylene fabrics in the polypropylene composite material are placed at 0-90 degrees with respect to each other along their respective warp directions.

It is the third objective of the present invention to provide a continuous hot-press molding system for the polypropylene composite material of present invention, as shown in the FIGURE, comprising a preheater 1, a crawler-type continuous flat hot-press 2, a crawler-type continuous flat cold-press 3, a sheet cutting machine 4 and a sheet stacking machine 5 that are sequentially arranged;

preferably, the crawler-type continuous flat hot-press 3 comprises a preheating unit 6, an independent heating and pressing unit 7, an air-cooling unit 8 and a lifting mechanism 9.

According to the present invention, in a preferred specific embodiment, the pressure is preferably continuously maintained during the hot-pressing and cooling process, and does not decrease, and the hot-pressing process is carried out continuously, preferably as shown in the FIGURE, the continuous hot-pressing composite shaping equipment consisting of a preheater 1, a crawler-type continuous flat hot-pressing 2, a crawler-type continuous flat cold-press 3, a sheet cutting machine 4 and a sheet stacking machine 5 is used; preferably, the crawler-type continuous flat hot-press 2 has a preheating unit 6, an independent heating and pressing unit 7, an air-cooling unit 8 and a lifting mechanism 9. In the preparation, the stretched polypropylene films, sheets or (and) fabrics are sequentially stacked and then preheated by a preheater 1, and the preheated samples are sequentially hot-pressed and fused by the crawler-type flat hot-press 2, then, it is cooled and shaped by the crawler-type continuous flat cold-press 3 to make the polypropylene composite material, that is, a stacked hot-pressed product. Afterwards, as required, the hot-pressed product is cut by the sheet cutting machine 4, and then stacked and arranged by the sheet stacking machine 5. Wherein, the hot-pressing temperature is controlled by the preheating unit 6, the independent heating and pressing unit 7, and the air-cooling unit 8 in the crawler-type continuous flat hot-press 2, and the hot-pressing pressure is controlled by the lifting mechanism 9.

Through the research conducted by the present inventors, it has been found that when the preparation process parameters are within the above preferred ranges, more preferably, the preparation equipment is employed to prepare the polypropylene composite material, the polypropylene composite material has better tensile strength, impact property, and interlayer peel strength.

It is the forth objective of the present invention to provide a use of the polypropylene composite material as described and the polypropylene composite material prepared by the preparation method as described above in the applications of consumer goods, automobile manufacturing, sports protection and military materials.

According to a specific embodiment of the present invention, the material field comprises luggage and transportation industry, shoe industry, automobile manufacturing industry, sports equipment manufacturing industry, audio equipment manufacturing industry and military field.

It is the fifth objective of the present invention to provide a polypropylene sheet, preferably used as the polypropylene sheet layer unit in the polypropylene composite material as described above, that is, as the polypropylene sheet layer unit in the self-reinforced polymer composite material, comprising layer A and layers B and B' located on both sides of layer A, with a structure of BAB'; wherein layer A contains polypropylene composition A, layer B is the same as or different from layer B', layer B contains polypropylene composition B, and layer B' contains polypropylene composition B', and the melting point of the polypropylene composition A is higher than the melting point of the polypropylene composition B and of the polypropylene composition B'; wherein the polypropylene composition A comprises polypropylene homopolymer a and polypropylene impact copolymer b; the polypropylene composition B, the polypropylene composition B' each comprise polypropylene random copolymer x and a thermal bonding enhancer y; preferably, the polypropylene random copolymer x has a molecular weight distribution Mw/Mn of 5-12, preferably 7-10.

In a preferred embodiment of the present invention, the polypropylene sheet further comprises layers C, C', with a structure of BCAC'B'; layer C is the same as or different from layer C', layer C contains polypropylene composition C, and layer C' contains polypropylene composition C'; the melting point of the polypropylene composition A is higher than the melting point of the polypropylene composition C and of the polypropylene composition C'; wherein the polypropylene composition C, the polypropylene composition C' each comprise polypropylene random copolymer β, polypropylene homopolymer γ and a thermal bonding enhancer z; preferably, the polypropylene random copolymer β has a molecular weight distribution Mw/Mn of 5-12, preferably 7-10.

The features described above with respect to the polypropylene sheet layer unit all apply to the polypropylene sheet. The features described with respect to layers $A_i$, $B_i$, $B_i'$, $C_i$ and $C_i'$ of polypropylene sheet layer unit apply to layers A, B, B', C and C' of polypropylene sheet, respectively; the features described with respect to polypropylene compositions $A_i$, $B_i$, $B_i'$, $C_i$ and $C_i'$ of polypropylene sheet layer unit apply to polypropylene compositions A, B, B', C and C' of polypropylene sheet, respectively; the features described with respect to polypropylene homopolymer $a_i$, polypropylene impact copolymer $b_i$, polypropylene random copolymer $x_i$, thermal bonding enhancer $y_i$, polypropylene random copolymer $β_i$, polypropylene homopolymer $γ_i$, and thermal bonding enhancer $z_i$ of polypropylene sheet layer unit apply to polypropylene homopolymer a, polypropylene impact copolymer b, polypropylene random copolymer x, thermal bonding enhancer y, polypropylene random copolymer β, polypropylene homopolymer γ, and thermal bonding enhancer z of polypropylene sheet, respectively.

In a preferred embodiment of the present invention, the melting point of the polypropylene composition A is greater than the melting point of the polypropylene compositions B, B'; preferably, the melting point of polypropylene homopolymer a in the polypropylene composition A is greater than the melting point of polypropylene random copolymer x in the polypropylene compositions B, B', preferably the temperature difference between the respective melting points is greater than or equal to 10° C. In this preferred specific embodiment, the inventors of the present invention surprisingly found that, the resultant polypropylene sheets are hot-pressed to obtain a polypropylene composite material having more excellent mechanical properties, and at the same time having better interlayer peel strength, even at a lower hot-pressing temperature and a wider hot-pressing temperature range, the interlayer peel strength of the obtained polypropylene composite material is higher.

Through the research conducted by the present inventors, it has been found that when the melt mass flow rates, polymer compositional ratios of the polypropylene composition A and the polypropylene compositions B, B' and thickness distribution of film layer A are within the preferred ranges, it is possible to enable a smoother preparation process of the sheet, which in turn enables the sheet to have better uniformity, tensile strength, impact property, and interlayer peel strength.

The BAB' sheet structure of the polypropylene sheet can be prepared by various methods. In a preferred embodiment of the present invention, the BAB' sheet structure of the polypropylene sheet is obtained by co-extruding the components comprising the polypropylene composition A and the polypropylene compositions B, B'.

In a preferred embodiment of the present invention, the melting point of polypropylene composition A is greater than the melting point of the polypropylene compositions B, B' and the polypropylene compositions C, C', preferably the temperature difference between the respective melting points is greater than or equal to 5° C., preferably greater than or equal to 10° C., more preferably greater than or equal to 20° C. Preferably, the melting point of the polypropylene homopolymer a in the components of polypropylene composition A is greater than the melting point of the polypropylene random copolymer β in the polypropylene compositions B, B' and the melting point of the polypropylene random copolymer x in the polypropylene compositions C, C', and the temperature difference between the respective melting points is greater than or equal to 10° C.

According to the present invention, there is no special limitation on a difference in melting points between polypropylene compositions B, B' and polypropylene compositions C, C' in the present invention.

Through the research conducted by the present inventors, it has been found that when the melt mass flow rates, differences in melting points, polymer compositional ratios and polymer composition thickness distributions of the polypropylene composition A, the polypropylene compositions B, B' and compositions C, C' are within the above preferred ranges, it is possible to enable a smoother preparation process of the sheet, which in turn enables the sheet to have better uniformity, tensile strength, impact property, and interlayer peel strength.

According to the present invention, the BCAC'B' sheet structure of the polypropylene composite material sheet is obtained by co-extruding the components comprising the polypropylene composition A, the polypropylene compositions B, B' and the polypropylene compositions C, C'.

It is the sixth objective of the present invention to provide a method for preparing the polypropylene sheet described above, comprising: polypropylene composition A, polypropylene composition B, polypropylene composition B', optional polypropylene composition C, optional polypropylene composition C' are co-extrusion molded, cast or calendered, and stretched according to BAB' structure or BCAC'B' structure to obtain the polypropylene sheet.

In a preferred embodiment of the present invention, the preparation of the polypropylene composition A comprises melt blending the components comprising the polypropylene homopolymer a and polypropylene impact copolymer b; and/or the preparation of the polypropylene compositions B, B' comprises melt blending the components comprising the polypropylene random copolymer x and thermal bonding enhancer y; and/or the preparation of the polypropylene compositions C, C' comprises melt blending the components comprising the thermal bonding enhancer z, polypropylene random copolymer β and polypropylene homopolymer γ; and/or the temperatures of the co-extrusion molding and casting are independently selected from 200-240° C.; and/or the temperature of the calendering roller is 50-70° C.; and/or the condition of the stretching comprises: the temperature of the stretching of 90-165° C., preferably 90-140° C., more preferably 90-119° C.; the stretching ratio of 1-15, preferably of 2-9.

According to some embodiments of the present invention, the polypropylene composition A, polypropylene composition B, polypropylene composition B', optional polypropylene composition C, optional polypropylene composition C' are co-extrusion molded, and cast or calendered according to BAB' structure or BCAC'B' structure to obtain a co-extruded polypropylene sheet. The process of the extrusion-calendering method may comprise the co-extruded polypropylene sheet is sequentially passed through a calendering roller and a pulling roller, and then subjected to solid phase stretching, edge cutting and rolling to prepare the sheets. Wherein, the temperature of extruding and casting is 200-230° C., and the temperature of the calendering roller is 50-70° C. The specific process of preparing a film by extrusion-calendering method is a common selection in the art, and there will be no more detailed description.

The features described above with respect to the preparation method of polypropylene sheet layer unit all apply to the preparation method of polypropylene sheet.

It is the seventh objective of the present invention to provide a polypropylene fabric, a three-dimensional polypropylene fabric obtained by weaving the polypropylene sheets as described above; preferably, the polypropylene fabric has a three-dimensional structure of plain weave, twill weave and/or satin weave.

In order to facilitate weaving, it is preferable to cut the polypropylene sheet to obtain a polypropylene sheet cuts with a width of 2-5 mm, and then weave them to obtain a polypropylene fabric.

In a more preferred embodiment of the present invention, the polypropylene fabric is a plain weaved, twill weaved, satin weaved or three-dimensional polypropylene fabric obtained by weaving a three-layer co-extruded and stretched polypropylene ribbon, and the three-layer co-extruded and stretched polypropylene ribbon comprises layer A formed from a high melting point polypropylene composition A and layers B, B' formed from low melting point polypropylene compositions B, B', wherein the polypropylene composition A comprises polypropylene homopolymer a, polypropylene impact copolymer b; polypropylene compositions B, B' comprise polypropylene random copolymer x, and thermal bonding enhancer y, and the three-layer polypropylene fabric has a structure of BAB' from bottom to top.

In a more preferred embodiment of the present invention, the polypropylene fabric is a plain weaved, twill weaved, satin weaved and/or three-dimensional polypropylene fabric obtained by weaving a five-layer co-extruded and stretched polypropylene ribbon, and the co-extruded and stretched polypropylene ribbon comprises layer A formed from a high melting point polypropylene composition A, intermediate layers C, C' formed from polypropylene compositions C and layers B, B' formed from a low melting point polypropylene composition B, wherein the polypropylene composition A comprises polypropylene homopolymer a, polypropylene impact copolymer b; polypropylene compositions C, C' comprise thermal bonding enhancer z, polypropylene random copolymer β, and polypropylene homopolymer γ; polypropylene compositions B, B' comprise polypropylene random copolymer x, and thermal bonding enhancer y, and the five-layer polypropylene fabric has a structure of BCAC'B' from bottom to top.

The features described above with respect to the polypropylene sheet layer unit and polypropylene sheet all apply to the polypropylene fabric It is the eighth objective of the present invention to provide a polypropylene composite material, prepared with multiple layers of polypropylene sheets as described above and/or polypropylene fabrics as described above via hot-pressing and fusing; preferably, the polypropylene fabrics are placed and stacked at 0-90 degrees with respect to each other along their respective warp directions from top to bottom, the number of layers is preferably greater than or equal to 2 layers, more preferably 2-200 layers; most preferably 4-100 layers. The polypropylene sheets are placed and stacked at 0-90 degrees with respect to each other along their respective machine directions from top to bottom, the number of layers is preferably greater than or equal to 2 layers, more preferably 2-200 layers; most preferably 4-100 layers.

In a preferred embodiment of the present invention, the polypropylene compositions A contained in each layer of the stacked polypropylene fabrics can be the same or different, and the polypropylene fabrics A contained in each layer can be selected independently, preferably the polypropylene compositions A in each layer are the same.

In a preferred embodiment of the present invention, the polypropylene composite material has at least one of the following features:

a tensile strength in machine direction of ≥150 MPa, preferably of ≥170 MPa;

a interlayer peel strength of ≥1 N/mm, preferably of ≥1.2 N/mm.

The tensile strength is measured in accordance with the method specified in GB/T1040.1-2018, the interlayer peel strength is measured in accordance with the method specified in GB/T2358-98. The corresponding samples in the above two tests are standard sample required in the above testing standards.

When the polypropylene composite material is obtained by hot-pressing and fusing of 24 layers of polypropylene fabrics and the thickness thereof is about 1.6 mm, it has a drop impact strength of ≥228J, preferably ≥240J.

The drop impact strength is determined in accordance with the methods specified in GB/T14153-1993, and the thickness of the sample is the thickness of the prepared product.

According to the present invention, when the polypropylene composite material sheet has a sheet structure of BCAC'B', the polypropylene composite material has at least one of the following features:

a tensile strength in machine direction (MD) of ≥150 MPa, preferably of ≥170 MPa; an interlayer peel strength of ≥1.1 N/mm, preferably of ≥1.3 N/mm. When the composite is obtained by hot-pressing and fusing of 24 layers of polypropylene fabrics and the thickness thereof is about 1.8 mm, it has a drop impact strength of ≥240J, preferably ≥250J.

It is the ninth objective of the present invention to provide method for preparing the polypropylene composite material as described above, comprising stacking, hot-pressing and fusing the polypropylene sheets and/or the polypropylene fabrics and then cooling and shaping them to form the polypropylene composite materials.

In a preferred embodiment of the present invention, the temperature of the hot-pressing and fusing is 115-170° C., preferably 115-159° C., more preferably 140-159° C.

In a preferred embodiment of the present invention, the pressure of the hot-pressing and fusing is 2-10 MPa.

In a preferred embodiment of the present invention, the preheating time of the hot-pressing and fusing is 5-600s, a hot-pressing time is 1-600s, preferably 10-500s.

In a preferred embodiment of the present invention, the pressure for cooling and shaping is 2-8 MPa and the cooling and shaping time is 30s-700s.

In a preferred embodiment of the present invention, the number of layers of the polypropylene sheets and/or polypropylene fabrics is greater than or equal to 2 layers, preferably 2-200 layers; more preferably 4-100 layers.

In a preferred embodiment of the present invention, the adjacent layers in the stack of the polypropylene sheets are placed at 0-90 degrees with respect to each other along their respective machine directions (MD).

In a preferred embodiment of the present invention, the adjacent layers in the stack of the polypropylene fabrics are placed at 0-90 degrees with respect to each other along their respective warp directions.

In a more preferred embodiment of the present invention, the method for preparing the high-strength and high-impact polypropylene composite material comprises the following steps:

step a: polypropylene composition A, polypropylene compositions B, B' are co-extrusion molded, and cast or calendered according to BAB' structure to obtain a co-extruded polypropylene sheet; preferably, the temperature of the extrusion, casting or calendering is 200-240° C., and the temperature of the calendering roller is 50-70° C.;

step b: the co-extruded polypropylene sheet is stretched at a certain temperature to obtain a stretched polypropylene sheet; preferably the temperature of the stretching is 90-165° C., preferably 90-140° C., more preferably 90-119° C., and the stretching ratio is 1-15, preferably of 2-9.

step c: the stretched polypropylene sheet is divided and cut to prepare polypropylene ribbons, weaving the ribbons to obtain a polypropylene fabric; preferably, the width of the polypropylene ribbon is 2-5 mm, and the polypropylene fabric comprises plain weaved, twill weaved, satin weaved or other three-dimensional polypropylene fabrics;

step d: the polypropylene fabric is sequentially stacked, and hot-pressed and fused, and then cooled and shaped to make the polypropylene composite material; preferably in step d, the hot-pressing condition is: hot-pressing temperature of 115-170° C., preferably 115-159° C., and more preferably 140-159° C.; hot-pressing pressure of 2-10 MPa, the preheating time of 5-600s, the hot-pressing time of 1-600s, preferably 10-500s, the cooling pressure of 2-8 MPa, and the cooling time of 30s-700s; preferably, the adjacent polypropylene fabrics in the polypropylene composite material can be placed at 0-90 degrees with respect to each other along their respective warp directions.

According to some embodiments of the present invention, in step c, the cutting can be performed by using a high-speed dividing and cutting machine with multi-blades, to obtain oriented polypropylene ribbons having a width of 2-5 mm. The oriented ribbons are weaved according to the designed fabric structure by using a commercial weaving machine to obtain plain weaved, twill weaved, satin weaved and/or other three-dimensional polypropylene fabrics.

In a more preferred embodiment of the present invention, the method for preparing the polypropylene composite material comprises the following steps:

step a: polypropylene composition A, polypropylene compositions C, C', polypropylene compositions B, B' are co-extrusion molded, and cast or calendered according to BCAC'B' structure to obtain a co-extruded polypropylene sheet; preferably, the temperature of extruding, casting or calendering is 200-230° C., and the temperature of the calendering roller is 50-70° C.;

step b: the co-extruded polypropylene sheet is stretched at a certain temperature to obtain a stretched polypropylene sheet; preferably the temperature of the stretching is 90-165° C., preferably 90-140° C., more preferably 90-119° C., and the stretching ratio is 1-15;

step c: the polypropylene stretched sheet is divided and cut to prepare polypropylene ribbons, weaving the ribbons to obtain a polypropylene fabric; preferably, the width of the polypropylene ribbon is 2-5 mm, and the polypropylene fabric comprises plain weaved, twill weaved, satin weaved or other three-dimensional polypropylene fabrics, step d: the polypropylene sheet or fabric is sequentially stacked, and hot-pressed and fused, and then cooled and shaped to make the polypropylene composite material; preferably the hot-pressing condition is: hot-pressing temperature of 115-170° C., preferably 115-159° C., and more preferably 140-159° C.; hot-pressing pressure of 2-10 MPa, the preheating time of 5-300s, the hot-pressing time of 1-300s, preferably 1-9s or 61-100s, the cooling pressure of 2-8 MPa, and the cooling time of 30s-700s; in the polypropylene composite material, the polypropylene fabrics can be placed at 0-90 degrees with respect to each other along their respective warp directions; and/or the polypropylene composite material sheets are placed at 0-90 degrees with respect to each other along their respective machine directions.

According to the present invention, in a preferred specific embodiment, the pressure is preferably continuously maintained during the hot-pressing and cooling process, and does not decrease, and the hot-pressing process is carried out continuously, preferably the continuous hot-pressing composite shaping equipment consisting of sequentially arranged preheater, a crawler-type continuous flat hot-press, a crawler-type continuous flat cold-press, a sheet cutting machine and a sheet stacking machine is used; preferably, the crawler-type continuous flat hot-press has a preheating unit, an independent heating and pressing unit, an air-cooling unit and a lifting mechanism.

In the preparation, the polypropylene sheets and/or the polypropylene fabrics are sequentially stacked and then preheated by the preheater, and the preheated samples are sequentially hot-pressed and fused by the crawler-type flat hot-press, then cooled and shaped by the crawler-type continuous flat cold-press to make a polypropylene composite material, that is, a stacked hot-pressed product. Afterwards, as required, the hot-pressed product is cut by the sheet cutting machine, and then stacked and arranged by the sheet stacking machine. Wherein, the hot-pressing temperature is controlled by the preheating unit, the independent heating and pressing unit, and the air-cooling unit in the crawler-type continuous flat hot-press, and the hot-pressing pressure is controlled by the lifting mechanism. Through the research conducted by the present inventors, it has been found that when the preparation process parameters are within the preferred ranges, preferably, the preparation equipment is employed to prepare the polypropylene composite material, the polypropylene composite material has better tensile strength, impact property, and interlayer peel strength.

It is the tenth objective of the present invention to provide a use of the polypropylene sheet as described above, the polypropylene fabric as described above, the polypropylene composite material as described above and the polypropylene composite material prepared by the preparation method as described above in the applications of sports protection, automobile manufacturing, consumer goods, and military materials.

According to a specific embodiment of the present invention, the material field comprises luggage and transportation industry, shoe industry, automobile manufacturing industry, sports equipment manufacturing industry, audio equipment manufacturing industry and military field.

Compared with the prior art, the present invention has the beneficial effects as follows:

(1) The polypropylene composite material of the present invention has a melting point gradient structure, with this specific structure, the inventors of the present invention surprisingly found that the resultant polypropylene composite material has good tensile strength, impact property, and interlayer peel strength at the same time.

In particular, when the polypropylene composite material sheets have a sheet structure of BAB', the polypropylene composite materials have following features: a tensile strength in machine direction (MD) of ≥150 MPa, preferably ≥170 MPa; an interlayer peel strength of ≥1 N/mm, preferably ≥1.2 N/mm; when the composite is obtained by hot-pressing and fusing of 24 layers of polypropylene fabrics and the thickness thereof is about 1.6 mm, it has a drop impact strength is ≥228J, preferably ≥240J.

In particular, when the polypropylene composite material sheets have a sheet structure of BCAC'B', the polypropylene composite materials have following features: a tensile strength in machine direction (MD) of ≥150 MPa, preferably ≥170 MPa; an interlayer peel strength of ≥1.1 N/mm, preferably of ≥1.3 N/mm. When the composite is obtained by hot-pressing and fusing of 24 layers of polypropylene fabrics and the thickness thereof is about 1.8 mm, it has a drop impact strength is ≥240J, preferably ≥250J.

(2) The polypropylene composite material of the present invention can be adapted to be prepared at a lower hot-pressing temperature and a wider hot-pressing temperature range. The hot-pressing temperature range can effectively reduce the energy consumption of equipment and the damage to composite material under high-temperature operation. At the same time, the composite still has a good interlayer peel strength when it prepared at a lower hot-pressing temperature.

(3) The preparation method can reduce hot-pressing operation time, improve production efficiency, and reduce production energy consumption.

(4) The present invention adopts a melting point gradient structure design, which reduces and expands the hot-pressing temperature, and the hot-pressing temperature range can reach 70° C.; effectively reduces energy consumption of equipment and the damage to composite material under high-temperature operation.

The present invention also relates to the following embodiments:

1. A polypropylene composite material, comprising a plurality of polypropylene sheet layer units that sequentially stacked, each polypropylene sheet layer unit comprises a core layer $A_i$ and outer layers $B_i$ and $B'_i$ located on both sides of the core layer $A_i$, with a structure of $B_iA_iB'_i$; the structure of the polypropylene composite material is $B_nA_nB'_n \ldots B_iA_iB'_i \ldots B_2A_2B'_2$, $B_1A_iB'_i$, $B_2A_2B'_2 \ldots B_iA_iB'_i \ldots B_nA_nB'_n$, from bottom to top, the total number of the stacked units of polypropylene sheet layer units is 2n−1; i and n are both integers not less than 2, and i≤n;

wherein, the core layer $A_i$ in the polypropylene sheet layer unit contains the polypropylene composition $A_i$, the outer layer $B_i$ is the same as or different from the outer layer $B'_i$, the outer layer $B_i$ contains a polypropylene composition $B_i$, and the outer layer $B'_i$ contains a polypropylene composition $B'_i$, the melting point of the polypropylene composition $A_i$ is greater than the melting point of the polypropylene composition $B_i$, the polypropylene composition $B'_i$; the melting point of the polypropylene composition $B_i$, the polypropylene composition $B'_i$ is greater than the melting point of their respective adjacent polypropylene composition $B'_{i-1}$, polypropylene composition $B_{i-1}$.

2. The polypropylene composite material according to embodiment 1, characterized in that:
a difference between the melting point of polypropylene composition $A_i$ and the melting point of polypropylene composition $B_i$, and a difference between the melting points of polypropylene composition $A_i$ and the melting point of polypropylene composition $B'_i$ are each greater than or equal to 10° C., preferably greater than or equal to 20° C.; and/or
the differences between the melting point of polypropylene composition $B_i$, the polypropylene composition $B'_i$ and the melting point of respective adjacent polypropylene composition $B'_{i-1}$, polypropylene composition $B_{i-1}$, same or different, are each 1-40° C., preferably 1-10° C., more preferably 1-5° C.

3. The polypropylene composite material according to embodiment 1, characterized in that: 2≤n≤100, preferably, 2≤n≤50.

4. The polypropylene composite material according to embodiment 1, characterized in that:
the thickness of the core layer $A_i$ in each polypropylene sheet layer unit accounts for 51%-89% of the total thickness, preferably 71%-89%, more preferably 71%-80%, based on the total thickness of each polypropylene sheet layer unit.

5. The polypropylene composite material according to embodiment 1, characterized in that:
the polypropylene composition $A_i$ comprises one or more of polypropylene homopolymer, polypropylene random copolymer and polypropylene impact copolymer; and/or
the polypropylene composition $B_i$ and $B'_i$ each comprise one or more of polypropylene homopolymer, polypropylene random copolymer and polypropylene impact copolymer; preferably, the polypropylene composition $B_i$ and/or polypropylene composition $B'_i$ also contain a thermal bonding enhancer $y_i$.

6. The polypropylene composite material according to embodiment 5, characterized in that:
the polypropylene composition $A_i$ comprises polypropylene homopolymer $a_i$ and polypropylene impact copolymer $b_i$;
preferably, the polypropylene composition $A_i$ comprises 50-99 wt % of polypropylene homopolymer $a_i$, 1-50 wt % of polypropylene impact copolymer $b_i$; more preferably, the polypropylene composition $A_i$ comprises 70-90 wt % of polypropylene homopolymer $a_i$, 10-30 wt % of polypropylene impact copolymer $b_i$, based on the total weight of the polypropylene composition $A_i$; and/or
the polypropylene composition $B_i$, the polypropylene composition $B'_i$ each comprise polypropylene random copolymer $x_i$ and a thermal bonding enhancer $y_i$;
preferably, the polypropylene composition $B_i$, the polypropylene composition $B'_i$ each comprise 70-99 wt % of polypropylene random copolymer $x_i$, 1-30 wt % thermal bonding enhancer $y_i$; preferably, the polypropylene composition $B_i$ comprises 80-90 wt % of polypropylene random copolymer $x_i$, 10-20 wt % of thermal bonding enhancer $y_i$, based on the total weight of each of the polypropylene composition $B_i$, the polypropylene composition $B'_i$.

7. The polypropylene composite material according to embodiment 6, characterized in that:
the polypropylene homopolymer $a_i$ has a melting point of 150-170° C.; and/or
the polypropylene homopolymer $a_i$ has an isotacticity (mm) not less than 96%; and/or
the polypropylene impact copolymer $b_i$ has a melting point of 150-170° C.; and/or the monomer copolymerized with propylene in the polypropylene impact copolymer is ethylene or butene, preferably butene; and/or the polypropylene impact copolymer has an Izod impact strength no less than 20 KJ/m$^2$.

8. The polypropylene composite material according to embodiment 6, characterized in that:

the polypropylene random copolymer $x_i$ has a melting point of 110-150° C., and the melting point of $x_i$ is greater than the melting point of $x_{i-1}$, preferably, the difference in the melting point between them is 1-40° C., more preferably 1-10° C., most preferably 1-5° C.; and/or the polypropylene random copolymer $x_i$ is a copolymer of propylene with ethylene and/or butene, preferably an ethylene-propylene-butene terpolymer and/or propylene-ethylene bipolymer.

9. The polypropylene composite material according to embodiment 6, characterized in that:

the thermal bonding enhancer $y_i$ has a melting point or viscous flow temperature of 70-110° C.; and/or the thermal bonding enhancer $y_i$ is selected from one or more of polyolefin elastomer, ethylene-propylene-diene-terpolymer rubber, SEBS, SBS, EVA, petroleum resin;

preferably, the thermal bonding enhancer $y_i$ is a polyolefin elastomer and/or petroleum resin.

10. The polypropylene composite material according to embodiment 9, characterized in that:

the polyolefin elastomer is an elastomer of ethylene copolymerized with propylene and/or α-olefin, the α-olefin is preferably a C4-C12 α-olefin, more preferably 1-butene and/or 1-octene; and/or the petroleum resin is C5 and/or C9 hydrogenated petroleum resin with a softening point of 100-150° C.; preferably is cyclopentadiene type resin.

11. The polypropylene composite material according to embodiment 5, characterized in that:

the polypropylene composition $A_i$ also comprises a β-nucleating agent; preferably, the β-nucleating agent is selected from at least one of polycyclic aromatic hydrocarbons, Group IIA two-component complexes, aromatic diamides, rare earth compounds and cyclic dicarboxylate nucleating agents; and/or the content of the β-nucleating agent in the polypropylene composition $A_i$ is 0.01-0.5 parts by weight, based on 100 parts by weight of the total amount of the polypropylene composition $A_i$.

12. The polypropylene composite material according to one of embodiments 1-11, characterized in that:

the polypropylene sheet layer unit is a polypropylene sheet and/or polypropylene fabric; preferably, the polypropylene sheet layer unit is a polypropylene sheet or polypropylene fabric; more preferably, the polypropylene sheet is prepared by co-extruding the components comprising polypropylene composition $A_i$, polypropylene composition $B_i$, and polypropylene composition $B'_i$; and/or the polypropylene fabric is prepared by the following method: firstly, co-extruding the components comprising polypropylene composition $A_i$, polypropylene composition $B_i$, polypropylene composition $B'_i$ to obtain a polypropylene sheet, and then weaving the polypropylene sheet to obtain a polypropylene fabric; preferably, the polypropylene fabric has a three-dimensional structure of plain weave, twill weave and/or satin weave.

13. The polypropylene composite material according to embodiment 12, characterized in that:

the various polypropylene sheet layer units are connected by hot-pressing bonding.

14. A method for preparing the polypropylene composite material according to one of embodiments 1-13 comprises the steps of: sequentially stacking 2n−1 polypropylene sheet layer units with the structure of $B_iA_iB'_i$ according to the order of $B_nA_nB'_n \ldots B_iA_iB'_i \ldots B_2A_2B'_2, B_1A_1B'_i, B_2A_2B'_2 \ldots B_iA_iB'_i \ldots B_nA_nB'_n$, and then performing hot-pressing and fusing.

15. The preparation method according to embodiment 14, characterized in that, comprising the steps of:

(1) polypropylene composition $A_i$, polypropylene composition $B_i$ and polypropylene composition $B'_i$ are co-extrusion molded, cast or calendered, and stretched according to $B_iA_iB'_i$ structure to obtain a polypropylene sheet;

(2) optionally, the polypropylene sheet is divided and cut and then weaved to obtain a polypropylene fabric of $B_iA_iB'_i$ structure;

(3) the polypropylene sheet and/or the polypropylene fabric are sequentially stacked and hot-pressed, and then cooled and shaped to form the polypropylene composite material.

16. The preparation method according to embodiment 15, characterized in that:

the preparation of the polypropylene composition $A_i$ in the step (1) comprises melt blending the components comprising at least one of the polypropylene homopolymer, polypropylene random copolymer and polypropylene impact copolymer; and/or the preparation of the polypropylene composition $B_i$ in the step (1) comprises melt blending the components comprising at least one of the polypropylene homopolymer, polypropylene random copolymer and polypropylene impact copolymer; and/or the temperatures of the co-extrusion molding and casting in the step (1) are independently selected from 200-240° C.; and/or the temperature of the calendering roller in the step (1) is 50-70° C.; and/or the temperature of the stretching in the step (1) is 90-165° C., preferably 90-140° C., more preferably 90-119° C.; and/or the stretching ratio in the step (1) is 1-15.

17. The preparation method according to embodiment 15, characterized in that:

in step (3):

the hot-pressing condition comprises: a hot-pressing temperature of 115-170° C., preferably 115-159° C., more preferably 140-159° C.; a hot-pressing pressure of 2-10 MPa, a preheating time of 5-600s, a hot-pressing time of 1-600s, preferably 10-500s; and/or a pressure for cooling and shaping of 2-8 MPa and a cooling time of 30s-700s; and/or the stacked adjacent polypropylene fabrics are placed at 0-90 degrees with respect to each other along their respective warp directions; and/or the stacked adjacent polypropylene sheets are placed at 0-90 degrees with respect to each other along their respective machine directions.

18. A continuous hot-press molding system for the polypropylene composite material described in any one of embodiments 1-13, comprising a preheater, a crawler-type continuous flat hot-press, a crawler-type continuous flat cold-press, a sheet cutting machine and a sheet stacking machine that sequentially arranged;

preferably, the crawler-type continuous flat hot-press comprises a preheating unit, an independent heating and pressing unit, an air-cooling unit and a lifting mechanism.

19. The use of polypropylene composite material described in any one of embodiments 1-13 and the polypropylene composite material prepared by the preparation method described in any one of embodiments 14-17 in the applications of consumer goods, automobile manufacturing, sports protection and military materials.

DESCRIPTION OF DRAWINGS

The FIGURE is a schematic diagram of the arrangement of processing equipment used in a preferred embodiment of the present invention.

1 is a preheater; 2 is a crawler-type continuous flat hot-press; 3 is a crawler-type continuous flat cold-press; 4 is a sheet cutting machine; 5 is a sheet stacking machine; the crawler-type continuous flat hot-pressing 2 has a preheating unit 6, an independent heating unit and pressing unit 7, an air-cooling unit 8 and a lifting mechanism 9.

DETAILED DESCRIPTION

The present invention will be described in detail below with reference to the following attached drawings and examples. It is necessary to point out here that the following examples are only for further illustration of the invention and should not be understood as a limitation of the protection scope of the present invention, and that some non-essential modifications and adjustments to the present invention made by a person skilled in the art are still within the protect scope of the present disclosure.

The properties of the polypropylene compositions and sheets are tested according to the following methods, and the product test results are shown in Table 1:

(1) melt mass flow rate (MFR): determined in accordance with the method specified in GB/T 3682-2000, wherein, for the polypropylene (including polypropylene homopolymer, polypropylene impact copolymer, and polypropylene random copolymer), the test temperature is 230° C., with a load of 2.16 kg; for the thermal bonding enhancer, the test temperature is 190° C., with a load of 2.16 kg.

(2) molecular weight distribution (Mw/Mn): determined in accordance with the method specified in GB/T 36214.1-2018, wherein Mw is a weight averaged molecular weight in an unit of g/mol, and Mn is a number averaged molecular weight in an unit of g/mol.

(3) melting point of a material: determined in accordance with the method specified in GB/T 28724-2012. The sample mass is 5 mg, and the temperature is raised from 50° C. to 230° C. at a rate of 10° C./min, kept at 230° C. for 3 min to eliminate thermal history, cooled down from 230° C. to 50° C. at a rate of 10° C./min, kept at 50° C. for 1 minute, and finally raised from 50° C. to 230° C. at a rate of 10° C./min, and take the last heating curve to determine the melting point or melting range of the material.

(4) sheet tensile strength: determined in accordance with the method specified in GB/T1040.1-2018.

(5) drop impact strength: determined in accordance with the method specified in GB/T14153-1993.

(6) interlayer peel strength: determined in accordance with the method specified in GB/T2358-98.

In the following examples, the β-crystal nucleating agent, with a grade of VP101B is from Beijing Research Institute of Chemical Industry, China Petroleum & Chemical Corporation; the sources of some raw materials are described in the examples, and the rest of the raw materials are commercially available, unless otherwise specified.

Example A1

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The component α is a polypropylene homopolymer prepared by Beijing Research Institute of Chemical Industry, SINOPEC, with a melting point of 160° C., a melt flow rate (melt mass flow rate) of 3.2 g/10 min, and an isotacticity of 97%; the component b is a polypropylene impact copolymer prepared by Beijing Research Institute of Chemical Industry, SINOPEC, with an ethylene content of 11 wt %, a melting point of 155° C., an Izod impact strength of 23KJ/m$^2$ (23° C.), a melt flow rate of 2.0 g/10 min. The components prepared above are weighted and mixed in proportion, wherein the mass fraction $W_a$ of the component α is 80 weight parts, the mass fraction $W_b$ of the component b is 20 weight parts.

β-nucleating agent, with a grade of VP101B, is added at 0.05 weight part. After that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain pallets of polypropylene composition A, with a melting point of 157° C. as tested.

(2) Preparation of Polypropylene Composition $B_i$:

the component $x_1$ is a polypropylene random copolymer prepared by Beijing Research Institute of Chemical Industry, SINOPEC, being an ethylene-propylene-butene terpolymer, with a molecular weight distribution (Mw/Mn) of 8.9, a melt flow rate of 8.1 g/10 min and a melting point of 130° C.; the component $x_2$ is a polypropylene random copolymer prepared by Beijing Research Institute of Chemical Industry, SINOPEC, being an ethylene-propylene-butene terpolymer, with a molecular weight distribution (Mw/Mn) of 7.6, a melt flow rate of 7.2 g/10 min and a melting point of 135° C.; the component $x_3$ is a polypropylene random copolymer prepared by Beijing Research Institute of Chemical Industry, SINOPEC, being an ethylene-propylene-butene terpolymer, with a molecular weight distribution (Mw/Mn) of 7.3, a melt flow rate of 6.6 g/10 min and a melting point of 140° C.; the component γ is a polyolefin elastomer with a grade of 6102 purchased from ExxonMobil company and is an ethylene-propylene copolymer.

The components prepared above are weighted and mixed in proportion, wherein the mass fraction $Wx_i$ of the component $x_i$ is 85 weight parts, the mass fraction $W_y$ of the component γ is 15 weight parts, the other steps are the same as step (1), pellets of polypropylene composition $B_i$(that is, $x_i+y=B_i$, i=1, 2, 3) are finally obtained. As tested, the melting point of $B_1$ is 127° C., the melting point of $B_2$ is 132° C., and the melting point of $B_3$ is 138° C.

(3) Preparation of the Three-Layer Co-Extruded Polypropylene Sheets:

The pellets of polypropylene composition A and polypropylene composition $B_i$ prepared in above steps (1) and (2) are dried, after that the polypropylene composition A is added into a core layer extruder of a multi-layer extrusion calendaring machine, and the polypropylene composition $B_i$ is added into upper and lower surface layer extruders of the multi-layer extrusion calendaring machine. After the pellets are co-extruded and compounded and flowed out through a die of the extruder, the pellets are sequentially passed through a calendering roller and a pulling roller, and then subjected to solid phase stretching, edge cutting and rolling to prepare sheets $B_1AB_1$, $B_2AB_2$, $B_3AB_3$, respectively. Wherein, the temperature of the extruding and casting is 230° C., and the temperature of the calendering roller is 58° C. During solid phase stretching, the temperature is 140° C., the stretching rate is 2 m/min, and stretching ratio is 7.

Composite film (polypropylene sheet) prepared after stretching and rolling is composed of upper surface layer (film $B_i$ of the outer layer), core layer (film A) and lower surface layer (film $B_i$ of the outer layer). The thickness of the composite film is 80 μm, wherein the thickness of film layer A accounts for 80% of the total thickness of the sheet.

(4) Preparation of Polypropylene Fabrics:

The three-layer co-extruded polypropylene sheets prepared in above step (3) are divided and cut into oriented polypropylene ribbons having a width of 3 mm by using a high-speed dividing and cutting machine with multi-blades. The oriented ribbons are weaved according to the designed fabric structure by using a commercial weaving machine to obtain plain weaved polypropylene fabrics $B_1AB_1$, $B_2AB_2$, $B_3AB_3$.

(5) Preparation of Polypropylene Composite Material:

The polypropylene fabrics prepared in above step (4) are sequentially stacked with a sequence of $B_3A_3B_3$, $B_2A_2B_2$, $B_1A_1B_1$, $B_2A_2B_2$, $B_3A_3B_3$ from bottom to top, wherein total number of stacked layers is 5, and the stacked polypropylene fabrics are hot-pressed and fused, cooled and shaped to form the polypropylene composite material. The polypropylene fabrics are placed at 90 degrees with respect to each other along their respective warp directions. The hot-pressing conditions employed are: a temperature of 145° C., a hot-pressing pressure of 5 MPa, a preheating time of 90s, a hot-pressing time of 90s and a cooling time of 300s. The thickness of the prepared polypropylene composite material is 391 μm.

Example A2

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The component α is a polypropylene homopolymer prepared by Beijing Research Institute of Chemical Industry, SINOPEC, with a melting point of 165° C., a melt flow rate of 8.1 g/10 min, and an isotacticity of 97%; the component b is a polypropylene impact copolymer prepared by Beijing Research Institute of Chemical Industry, SINOPEC, with an ethylene content of 8 wt %, a melting point of 155° C., a melt flow rate of 3.2 g/10 min, an Izod impact strength of 25KJ/m² (23° C.). The components prepared above are weighted and mixed in proportion, wherein the mass fraction $W_a$ of the component α is 70 weight parts, the mass fraction $Wb_n$ of the component b is 30 weight parts. β-nucleating agent, with a grade of VP101B, is added at 0.05 weight part. After that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain pallets of polypropylene composition A, with a melting point of 161° C. as tested.

(2) Preparation of Polypropylene Composition $B_i$:

the component $x_i$ is a polypropylene random copolymer prepared by Beijing Research Institute of Chemical Industry, SINOPEC, being an ethylene-propylene-butene terpolymer, with a molecular weight distribution (Mw/Mn) of 8.4, a melting point of 128° C., and a melt flow rate of 7.8 g/10 min; the component $x_2$ is a polypropylene random copolymer prepared by Beijing Research Institute of Chemical Industry, SINOPEC, being an ethylene-propylene-butene terpolymer, with a molecular weight distribution (Mw/Mn) of 7.6, a melting point of 134° C., and a melt flow rate of 6.9 g/10 min; the component $x_3$ is a polypropylene random copolymer prepared by Beijing Research Institute of Chemical Industry, SINOPEC, being an ethylene-propylene-butene terpolymer, with a molecular weight distribution (Mw/Mn) of 7.1, a melting point of 142° C., and a melt flow rate of 5.2 g/10 min; the component γ is a polyolefin elastomer with a grade prepared by Beijing Research Institute of Chemical Industry, SINOPEC, being an ethylene-propylene copolymer, with an ethylene content of 15 wt %, a melting point of 105° C., a melt flow rate at 2.16 kg load of 9 g/10 min.

The components prepared above are weighted and mixed in proportion, wherein the mass fraction $Wx_i$ of the component $x_i$ is 80 weight parts, the mass fraction $W_y$ of the component γ is 20 weight parts, the other steps are the same as step (1), pellets of polypropylene composition $B_i$ (that is, $x_i$+y=$B_i$, i=1, 2, 3) are finally obtained. As tested, the melting point of $B_1$ is 126° C., the melting point of $B_2$ is 133° C., and the melting point of $B_3$ is 140° C.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The preparation process is the same as the step (5) of Example A1.

The thickness of the prepared polypropylene composite material is similar to that of Example A1.

Example A3

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

Same as Example A1, wherein the mass fraction $W_a$ of the component α is 90 weight parts, the mass fraction $W_b$ of the component b is 10 weight parts. β-nucleating agent, with a grade of VP101B, is added at 0.05 weight part. Pellets of polypropylene composition A are obtained. As tested, the melting point of the pellets of polypropylene composition A is 158° C.

(2) Preparation of Polypropylene Composition $B_i$:

Same as Example A1, wherein the mass fraction $Wx_i$ of the corresponding component $x_i$ is 90 weight parts, the mass fraction $W_y$ of the component γ is 10 weight parts, pellets of polypropylene composition $B_i$(that is, $x_i+y=B_i$, i=1, 2, 3) are finally obtained. As tested, the melting point of $B_i$ is 128° C., the melting point of $B_2$ is 134° C., and the melting point of $B_3$ is 139° C.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The preparation process is the same as the step (5) of Example A1.

The thickness of the prepared polypropylene composite material is similar to that of Example A1.

Example A4

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition $B_i$:

The preparation process is the same as the step (2) of Example A1.

(3) Preparation of the Three-Layer Co-Extruded Polypropylene Sheets:

The main steps are the same as Example A1. The thickness of the polypropylene sheets is 80 μm, wherein the thickness of film layer A accounts for 90% of the total thickness of the sheet.

(4) Preparation of Polypropylene Fabrics:

The preparation process is the same as the step (4) of Example A1.

(5) Preparation of Polypropylene Composite Material:

The preparation process is the same as the step (5) of Example A1.

The thickness of the prepared polypropylene composite material is similar to that of Example A1.

Example A5

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition $B_i$:

The preparation process is the same as the step (2) of Example A1.

(3) Preparation of the Three-Layer Co-Extruded Polypropylene Sheets:

The main steps are the same as Example A1. The thickness of the polypropylene sheets is 80 μm, wherein the thickness of film layer A accounts for 70% of the total thickness of the sheet.

(4) Preparation of Polypropylene Fabrics:

The preparation process is the same as the step (4) of Example A1.

(5) Preparation of Polypropylene Composite Material:

The preparation process is the same as the step (5) of Example A1.

The thickness of the prepared polypropylene composite material is similar to that of Example A1.

Example A6

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition $B_i$:

The preparation process is the same as the step (2) of Example A1.

(3) Preparation of the Three-Layer Co-Extruded Polypropylene Sheets:

The preparation process is the same as the step (3) of Example A1.

(4) Preparation of Polypropylene Fabrics:

The main steps are the same as step (4) of Example A1. The oriented ribbons are weaved according to the designed fabric structure by using a commercial weaving machine to obtain satin weaved polypropylene fabrics.

(5) Preparation of Polypropylene Composite Material:

The preparation process is the same as the step (5) of Example A1.

The thickness of the prepared polypropylene composite material is similar to that of Example A1.

Example A7

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition $B_i$:

The preparation process is the same as the step (2) of Example A1.

(3) Preparation of the Three-Layer Co-Extruded Polypropylene Sheets:

The main preparation process is the same as the step (3) of Example A1. Wherein, the stretching ratio of the sheet is 10.

(4) Preparation of Polypropylene Fabrics:

The preparation process is the same as the step (4) of Example A1.

(5) Preparation of Polypropylene Composite Material:

The preparation process is the same as the step (5) of Example A1.

The thickness of the prepared polypropylene composite material is similar to that of Example A1.

Example A8

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition $B_i$:

The preparation process is the same as the step (2) of Example A1.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The main preparation process is the same as the step (5) of Example A1. Wherein, the polypropylene fabrics are placed at 45 degrees with respect to each other along their respective warp directions.

The thickness of the prepared polypropylene composite material is similar to that of Example A1.

Example A9

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition $B_i$:

The preparation process is the same as the step (2) of Example A1.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The main preparation process is the same as the step (5) of Example A1. Wherein, the polypropylene fabrics are placed at 0 degree with respect to each other along their respective warp directions.

The thickness of the prepared polypropylene composite material is similar to that of Example A1.

Example A10

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

Same as Example A1, except that no β-nucleating agent is added to component A.

(2) Preparation of Polypropylene Composition $B_i$:

Same as Example A1.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The preparation process is the same as the step (5) of Example A1.

The thickness of the prepared polypropylene composite material is similar to that of Example A1.

Example A11

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The component α is a polypropylene homopolymer prepared by Beijing Research Institute of Chemical Industry, SINOPEC, with a melting point of 160° C., a melt flow rate (melt mass flow rate) of 3.2 g/10 min, and an isotacticity of 97%; the component b is a polypropylene impact copolymer prepared by Beijing Research Institute of Chemical Industry, SINOPEC, with an ethylene content of 11 wt %, a melting point of 155° C., an Izod impact strength of 23KJ/m$^2$ (23° C.), a melt flow rate of 2.0 g/10 min. The components prepared above are weighted and mixed in proportion, wherein the mass fraction $W_a$ of the component α is 80 weight parts, the mass fraction $W_b$ of the component b is 20 weight parts.

β-nucleating agent, with a grade of VP101B, is added at 0.05 weight part. After that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain pallets of polypropylene composition A, with a melting point of 157° C. as tested.

(2) Preparation of Polypropylene Composition B:

the component α is a polyolefin elastomer with a grade of 6102 purchased from ExxonMobil company and is an ethylene-propylene copolymer, with an ethylene content of 16 wt % (a melt flow rate at 190° C., 2.16 kg load of 1.4 g/10 min); the component $β_1$ is a polypropylene random copolymer prepared by Beijing Research Institute of Chemical Industry, SINOPEC, being an ethylene-propylene-butene terpolymer, with a molecular weight distribution (Mw/Mn) of 8.9, a melt flow rate of 8.1 g/10 min and a melting point of 130° C.; the component $β_2$ is a polypropylene random copolymer prepared by Beijing Research Institute of Chemical Industry, SINOPEC, being an ethylene-propylene-butene terpolymer, with a molecular weight distribution (Mw/Mn) of 7.6, a melt flow rate of 7.2 g/10 min and a melting point of 135° C.; the component $\beta_3$ is a polypropylene random copolymer prepared by Beijing Research Institute of Chemical Industry, SINO-PEC, being an ethylene-propylene-butene terpolymer, with a molecular weight distribution (Mw/Mn) of 7.3, a melt flow rate of 6.6 g/10 min and a melting point of 140° C.; the component γ is a polypropylene homopolymer prepared by Beijing Research Institute of Chemical Industry, SINOPEC, with a melt flow rate of 3.2 g/10 min, a melting point of 160° C. and an isotacticity of 97%.

The components prepared above are weighted and mixed in proportion, wherein the mass fraction $W_\alpha$ of the component α is 45 weight parts, the mass fraction $W_\beta$ of the component β is 45 weight parts, $W_\gamma$ is 10 weight parts, the other steps are the same as step (1), pellets of polypropylene composition $B_i$ (that is, $\alpha+\beta_i+\gamma=B_i$, i=1, 2, 3) are finally obtained. As tested, the melting point of $B_1$ is 129° C., the melting point of $B_2$ is 136° C., and the melting point of $B_3$ is 141° C.

(3) Preparation of Polypropylene Composition C:

the component $x_1$ is a polypropylene random copolymer prepared by Beijing Research Institute of Chemical Industry, SINOPEC, being an ethylene-propylene-butene terpolymer, with a molecular weight distribution (Mw/Mn) of 8.9, a melt flow rate of 8.1 g/10 min and a melting point of 130° C.; the component $x_2$ is a polypropylene random copolymer prepared by Beijing Research Institute of Chemical Industry, SINOPEC, being an ethylene-propylene-butene terpolymer, with a molecular weight distribution (Mw/Mn) of 7.6, a melt flow rate of 7.2 g/10 min and a melting point of 135° C.; the component $x_3$ is a polypropylene random copolymer prepared by Beijing Research Institute of Chemical Industry, SINOPEC, with a molecular weight distribution (Mw/Mn) of 7.3, being an ethylene-propylene-butene terpolymer, a melt flow rate of 6.6 g/10 min and a melting point of 140° C.; the component γ is a polyolefin elastomer with a grade of 6102 purchased from ExxonMobil company and is an ethylene-propylene copolymer.

The components prepared above are weighted and mixed in proportion, wherein the mass fraction $Wx_i$ of the component $x_i$ is 85 weight parts, the mass fraction $W_y$ of the component γ is 15 weight parts, the other steps are the same as step (1), pellets of polypropylene composition $C_i$(that is, $x_i+y=C_i$, i=1, 2, 3) are finally obtained. As tested, the melting point of $C_1$ is 127° C., the melting point of $C_2$ is 132° C., and the melting point of $C_3$ is 138° C.

(4) Preparation of the Five-Layer Co-Extruded Polypropylene Composite Material Sheets:

The pellets of polypropylene composition A, polypropylene composition B and polymer C prepared in above steps (1), (2) and (3) are dried, after that the polypropylene composition A is added into a core layer extruder of a multi-layer extrusion calendaring machine, the polypropylene composition B is added into middle layer extruders of the multi-layer extrusion calendaring machine, and the polypropylene composition C is added into upper and lower surface layer extruders of the multi-layer extrusion calendaring machine. After the pellets are co-extruded and compounded and flowed out through a die of the extruder, the pellets are sequentially passed through a calendering roller and a pulling roller, and then subjected to solid phase stretching, edge cutting and rolling to prepare the sheets. Wherein, the temperature of extruding and casting is 230°

C., and the temperature of the calendering roller is 60° C. During solid phase stretching, the temperature is 138° C., the stretching rate is 2 m/min, and stretching ratio is 7.

The polypropylene composite material sheet (composite film) prepared after stretching and rolling is composed of upper surface layer (film layer $C_i$), middle layer (film layer $B_i$), core layer (film layer $A_i$), middle layer (film layer $B_i$) and lower surface layer (film layer $C_i$). The thickness of the polypropylene composite material sheets is 80 μm, wherein the thickness of film layer $A_i$ accounts for 80% of the total thickness of the sheet, the thickness of film $B_i$ accounts for 10% of the total thickness of the sheet and the thickness of film $C_i$ accounts for 10% of the total thickness of the sheet.

(5) Preparation of Polypropylene Fabrics:

The preparation process is the same as the step (5) of Example A1.

(6) Preparation of Polypropylene Composite Material:

The preparation process is the same as the step (6) of Example A1.

The thickness of the prepared polypropylene composite material is similar to that of Example A1.

Example A12

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition B:

The main preparation process is the same as the step (2) of Example A1. Except that the material of component $B_i$ and $x_i$ is selected as follows:

the component $x_i$ is a polypropylene random copolymer prepared by Beijing Research Institute of Chemical Industry, SINOPEC, being an ethylene-propylene-butene terpolymer, with a melting point of 110° C.; the component $x_2$ is a polypropylene random copolymer prepared by Beijing Research Institute of Chemical Industry, SINOPEC, being an ethylene-propylene-butene terpolymer, with a melting point of 115° C.; the component $x_3$ is a polypropylene random copolymer prepared by Beijing Research Institute of Chemical Industry, SINOPEC, being an ethylene-propylene-butene terpolymer, with a melting point of 120° C.; the component $x_4$ is a polypropylene random copolymer prepared by Beijing Research Institute of Chemical Industry, SINOPEC, being an ethylene-propylene-butene terpolymer, with a melting point of 125° C.; the component $x_5$ is a polypropylene random copolymer prepared by Beijing Research Institute of Chemical Industry, SINOPEC, being an ethylene-propylene-butene terpolymer, with a melting point of 130° C.; the component $x_6$ is a polypropylene random copolymer prepared by Beijing Research Institute of Chemical Industry, SINOPEC, being an ethylene-propylene-butene terpolymer, with a melting point of 135° C.; the component $x_7$ is a polypropylene random copolymer prepared by Beijing Research Institute of Chemical Industry, SINOPEC, being an ethylene-propylene-butene terpolymer, with a melting point of 140° C.; the component $x_8$ is a polypropylene random copolymer prepared by Beijing Research Institute of Chemical Industry, SINOPEC, being an ethylene-propylenebutene terpolymer, with a melting point of 145° C.; the component $x_9$ is a polypropylene random copolymer prepared by Beijing Research Institute of Chemical Industry, SINOPEC, being an ethylene-propylene-butene terpolymer, with a melting point of 150° C.; wherein, the molecular weight distributions Mw/Mn of components $x_1$-$x_9$ are all between 7-10, the melt flow rates of components $x_1$-$x_9$ are all between 1-20 g/10 min.

Pellets of polypropylene composition $B_i$(that is, $x_i$+y=$B_i$, i=1, 2, 3, 4, 5, 6, 7, 8, 9) are finally obtained. As tested, the melting point of $B_i$ is 110° C., the melting point of $B_2$ is 113° C., the melting point of $B_3$ is 117° C., the melting point of $B_4$ is 123° C., the melting point of $B_5$ is 127° C., the melting point of $B_6$ is 133° C., the melting point of $B_7$ is 137° C., the melting point of $B_8$ is 142° C., and the melting point of $B_9$ is 148° C.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The polypropylene fabrics prepared in above step (4) are sequentially stacked with a sequence of $B_9A_9B_9 \ldots B_3A_3B_3$, $B_2A_2B_2$, $B_1A_iB_i$, $B_2A_2B_2$, B3A3B3, . . . $B_9A_9B_9$ from bottom to top, wherein total number of stacked layers is 17, and the stacked polypropylene fabrics are hot-pressed and fused, cooled and shaped to form the polypropylene composite material. The polypropylene fabrics are placed at 90 degrees with respect to each other along their respective warp directions. The hot-pressing conditions employed are: a temperature of 150° C., a hot-pressing pressure of 5 MPa, a preheating time of 300s, a hot-pressing time of 180s and a cooling time of 600s. The thickness of the prepared polypropylene composite material is 1.24 mm.

Example A13

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition B:

The main preparation process is the same as the step (2) of Example A1. Except that the material of component $B_i$ and $x_i$ is selected as follows:

the components $x_1$-$x_3$ are a polypropylene random copolymer prepared by Beijing Research Institute of Chemical Industry, SINOPEC, being an ethylene-propylene-butene terpolymer, with a melting point of 110° C.; the components $x_4$-$x_6$ are a polypropylene random copolymer prepared by Beijing Research Institute of Chemical Industry, SINOPEC, being an ethylene-propylene-butene terpolymer, with a melting point of 130° C.; the components $x_7$-$x_9$ are a polypropylene random copolymer prepared by Beijing Research Institute of Chemical Industry, SINOPEC, being an ethylene-propylene-butene terpolymer, with a melting point of 150° C.; wherein, the molecular weight distributions Mw/Mn of components $x_1$-$x_9$ are all between 7-10, the melt flow rates of components $x_1$-$x_9$ are all between 1-20 g/10 min.

Pellets of polypropylene composition $B_i$(that is, $x_i$+y=$B_i$, i=1, 2, 3, 4, 5, 6, 7, 8, 9 . . . 27) are finally obtained. As tested, the melting point of $B_1$-$B_3$ is 110° C., the melting point of $B_4$-$B_6$ is 127° C., and the melting point of $B_7$-$B_9$ is 148° C.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The polypropylene fabrics prepared in above step (4) are sequentially stacked with a sequence of $B_9A_9B_9 \ldots B_3A_3B_3$, $B_2A_2B_2$, $B_1A_iB_1$, $B_2A_2B_2$, B3A3B3, . . . $B_9A_9B_9$ from bottom to top, wherein total number of stacked layers is 17, and the stacked polypropylene fabrics are hot-pressed and fused, cooled and shaped to form the polypropylene composite material. The polypropylene fabrics are placed at 90 degrees with respect to each other along their respective warp directions. The hot-pressing conditions employed are: a temperature of 150° C., a hot-pressing pressure of 5 MPa, a preheating time of 300s, a hot-pressing time of 180s and a cooling time of 600s. The thickness of the prepared polypropylene composite material is 1.24 mm.

Example A14

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition B:

The preparation process is the same as the step (2) of Example A1.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The main steps are the same as Example A1. Except that the hot-pressing conditions are changed to: a temperature of 150° C., a hot-pressing pressure of 8 MPa, a preheating time of 180s, a hot-pressing time of 180s and a cooling time of 700s. The thickness of the prepared polypropylene composite material is 387 μm.

Example A15

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition B:

The main preparation process is the same as the step (2) of Example A1, except that the material of component $B_i$ and $x_i$ is selected as follows:

the component $x_1$ is a polypropylene random copolymer prepared by Beijing Research Institute of Chemical Industry, SINOPEC, being an ethylene-propylene-butene terpolymer, with a melting point of $110°$ C.; the component $x_2$ is a polypropylene random copolymer prepared by Beijing Research Institute of Chemical Industry, SINOPEC, being an ethylene-propylene-butene terpolymer, with a melting point of $130°$ C.; the component $x_3$ is a polypropylene random copolymer prepared by Beijing Research Institute of Chemical Industry, SINOPEC, being an ethylene-propylene-butene terpolymer, with a melting point of $150°$ C. Wherein, the molecular weight distributions Mw/Mn of components $x_1$-$x_3$ are all between 7-10, the melt flow rates of components $x_1$-$x_3$ are all between 1-20 g/10 min.

Pellets of polypropylene composition $B_i$ (that is, $x_i$+y=$B_i$, i=1, 2, 3) are finally obtained. As tested, the melting point of $B_i$ is $110°$ C., the melting point of $B_2$ is $128°$ C., and the melting point of $B_3$ is $147°$ C.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The preparation process is the same as the step (5) of Example A1.

The thickness of the prepared polypropylene composite material is similar to that of Example A1.

Example A16

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition B:

The preparation process is the same as the step (2) of Example A1.

(3) Preparation of the Three-Layer Co-Extruded Polypropylene Sheets:

The preparation process is the same as the step (3) of Example A1.

(4) Preparation of Polypropylene Composite Material:

Instead of preparing the polypropylene fabrics, the three-layer co-extruded polypropylene sheets obtained in step (3) (replacing the polypropylene fabrics obtained in step (4) in example A1) are subjected to sequential stacking and hot-pressing according to step (5) in example A1.

The thickness of the obtained polypropylene composite materials is similar to that of Example A1.

Example A17

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example A1.

(2) Preparation of Polypropylene Composition B:

The main preparation process is the same as the step (2) of Example A1. Except that the material of component $B_i$ and $x_i$ is selected as follows:

the components $x_1$-$x_3$ are a polypropylene random copolymer prepared by Beijing Research Institute of Chemical Industry, SINOPEC, being an ethylene-propylene-butene terpolymer, with a melting point of $110°$ C.; the components $x_4$-$x_6$ are a polypropylene random copolymer prepared by Beijing Research Institute of Chemical Industry, SINOPEC, being an ethylene-propylene-butene terpolymer, with a melting point of $115°$ C.; the components $x_7$-$x_9$ are a polypropylene random copolymer prepared by Beijing Research Institute of Chemical Industry, SINOPEC, being an ethylene-propylene-butene terpolymer, with a melting point of $120°$ C.; the components $x_{10}$-$x_{12}$ are a polypropylene random copolymer prepared by Beijing Research Institute of Chemical Industry, SINOPEC, being an ethylene-propylene-butene terpolymer, with a melting point of $125°$ C.; the components $x_{13}$-$x_{15}$ are a polypropylene random copolymer prepared by Beijing Research Institute of Chemical Industry, SINOPEC, being an ethylene-propylene-butene terpolymer, with a melting point of $130°$ C.; the components $x_{16}$-$x_{18}$ are a polypropylene random copolymer prepared by Beijing Research Institute of Chemical Industry, SINOPEC, being an ethylene-propylene-butene terpolymer, with a melting point of $135°$ C.; the components $x_{19}$-$x_{21}$ are a polypropylene random copolymer prepared by Beijing Research Institute of Chemical Industry, SINOPEC, being an ethylene-propylene-butene terpolymer, with a melting point of $140°$ C.; the components $x_{22}$-$x_{24}$ are a polypropylene random copolymer prepared by Beijing Research Institute of Chemical Industry, SINOPEC, being an ethylene-propylene-butene terpolymer, with a melting point of $145°$ C.; the components $x_{25}$-$x_{27}$ are a polypropylene random copolymer prepared by Beijing Research Institute of Chemical Industry, SINOPEC, being an ethylene-propylene-butene terpolymer, with a melting point of $150°$ C.; wherein, the molecular weight distributions Mw/Mn of components $x_1$-$x_{27}$ are all between 7-10, the melt flow rates of components $x_1$-$x_{27}$ are all between 1-20 g/10 min.

Pellets of polypropylene composition $B_i$ (that is, $x_i$+y=$B_i$, i=1, 2, 3, 4, 5, 6, 7, 8, 9 . . . 27) are finally obtained. As tested, the melting point of $B_1$-$B_3$ is $110°$ C., the melting point of $B_4$-$B_6$ is $113°$ C., the melting point of $B_7$-$B_9$ is $117°$ C., the melting point of $B_{10}$-$B_{12}$ is $123°$ C., the melting point of $B_{13}$-$B_{15}$ is $127°$ C., the melting point of $B_{16}$-$B_{18}$ is $133°$ C., the melting point of $B_{19}$-$B_{21}$ is $137°$ C., the melting point of $B_{22}$-$B_{24}$ is $142°$ C., and the melting point of $B_{25}$-$B_{27}$ is $148°$ C.

(3) Preparation of the Three-Layer Co-Extruded Polypropylene Sheets:

The preparation process is the same as the step (3) of Example A1.

(4) Preparation of Polypropylene Fabrics:

The preparation process is the same as the step (4) of Example A1.

(5) Preparation of Polypropylene Composite Material:

The polypropylene fabrics prepared in above step (4) are sequentially stacked with a sequence of $B_{27}A_{27}B_{27}$ . . . $B_9A_9B_9$ . . . $B_3A_3B_3$, $B_2A_2B_2$, $B_iA_iB_i$, $B_2A_2B_2$, B3 A3B3, . . . $B_9A_9B_9$ . . . $B_{27}A_{27}B_{27}$ from bottom to top, wherein total number of stacked layers is 53, and the stacked polypropylene fabrics are hot-pressed and fused, cooled and shaped to form the polypropylene composite material. The polypropylene fabrics are placed at 90 degrees with respect to each other along their respective warp directions. The hot-pressing conditions employed are: a temperature of 150° C., a hot-pressing pressure of 5 MPa, a preheating time of 500s, a hot-pressing time of 360s and a cooling time of 800s. The thickness of the prepared polypropylene composite material is 3.92 mm.

Example A18

The co-extruded polypropylene sheets are prepared according to the methods in Example A1, except that the material of component Bi is selected as follows: the component $x_1$ is a polypropylene random copolymer prepared by Beijing Research Institute of Chemical Industry, SINOPEC, being an ethylene-propylene-butene terpolymer, with a molecular weight distribution (Mw/Mn) of 4.2, and a melting point of 142° C.; the component $x_2$ is a polypropylene random copolymer prepared by Beijing Research Institute of Chemical Industry, SINOPEC, being an ethylene-propylene-butene terpolymer, with a molecular weight distribution (Mw/Mn) of 4.7, and a melting point of 138° C.; the component $x_3$ is a polypropylene random copolymer prepared by Beijing Research Institute of Chemical Industry, SINOPEC, being an ethylene-propylene-butene terpolymer, with a molecular weight distribution (Mw/Mn) of 5.4, and a melting point of 133° C.; the melt flow rates of components $x_1$-$x_3$ are all between 2-10 g/10 min.

Pellets of polypropylene composition $B_i$(that is, $x_i$+y=$B_i$, i=1, 2, 3) are finally obtained. As tested, the melting point of $B_i$ is 139° C., the melting point of $B_2$ is 134° C., and the melting point of $B_3$ is 129° C.

Comparative Example A1

The co-extruded polypropylene sheets are prepared according to the methods in Example A1, except that the material of component $B_i$ is selected as follows: the component $x_i$ is a polypropylene random copolymer prepared by Beijing Research Institute of Chemical Industry, SINOPEC, being an ethylene-propylene-butene terpolymer, with a melting point of 140° C.; the component $x_2$ is a polypropylene random copolymer prepared by Beijing Research Institute of Chemical Industry, SINOPEC, being an ethylene-propylene-butene terpolymer, with a melting point of 135° C.; the component $x_3$ is a polypropylene random copolymer prepared by Beijing Research Institute of Chemical Industry, SINOPEC, being an ethylene-propylene-butene terpolymer, with a melting point of 130° C.; the molecular weight distributions Mw/Mn of components $x_1$-$x_3$ are all between 7-10, the melt flow rates of components $x_1$-$x_3$ are all between 2-10 g/10 min.

Pellets of polypropylene composition $B_i$(that is, $x_i$+y=$B_i$, i=1, 2, 3) are finally obtained. As tested, the melting point of $B_1$ is 138° C., the melting point of $B_2$ is 132° C., and the melting point of $B_3$ is 127° C.

Comparative Example A2

The three-layer co-extruded polypropylene sheets are prepared according to the methods in Example A1, except that the polypropylene composition $B_i$ contains only component y.

The polypropylene fabrics and polypropylene composite material are prepared according to the methods in Example A1.

Comparative Example A3

The three-layer co-extruded polypropylene sheets are prepared according to the methods in Example A1, except that the thickness of film layer A accounts for 95% of the total thickness of the sheet. The polypropylene fabrics and polypropylene composite material are prepared according to the methods in Example A1.

Comparative Example A4

The three-layer co-extruded polypropylene sheets are prepared according to the methods in Example A1, except that the thickness of film layer A accounts for 50% of the total thickness of the sheet. The polypropylene fabrics and polypropylene composite material are prepared according to the methods in Example A1.

Comparative Example A5

The co-extruded polypropylene sheets (17 layers) are prepared according to the methods in Example A12, except that the material of component $B_i$ is selected as follows: the components $x_1$-$x_9$ are all a polypropylene random copolymer prepared by Beijing Research Institute of Chemical Industry, SINOPEC, with a melting point of 110° C.; and the molecular weight distributions Mw/Mn of components $x_1$-$x_9$ are all between 7-10, the melt flow rates of components $x_1$-$x_9$ are all between 2-10 g/10 min.

Pellets of polypropylene composition $B_i$ are finally obtained. As tested, the melting point of $B_i$ is 110° C.

The hot-pressing conditions employed are: a temperature of 150° C., a hot-pressing pressure of 5 MPa, a preheating time of 300s, a hot-pressing time of 180s and a cooling time of 600s. The thickness of the prepared polypropylene composite material is 1.24 mm.

Comparative Example A6

The co-extruded polypropylene sheets (17 layers) are prepared according to the methods in Example A12, except that the material of component $B_i$ is selected as follows: the components $x_1$-$x_9$ are all a polypropylene random copolymer prepared by Beijing Research Institute of Chemical Industry, SINOPEC, with a melting point of 130° C.; and the molecular weight distributions Mw/Mn of components $x_1$-$x_9$ are all between 7-10, the melt flow rates of components $x_1$-$x_9$ are all between 2-10 g/10 min.

Pellets of polypropylene composition $B_i$ are finally obtained. As tested, the melting point of $B_i$ is 127° C.

The hot-pressing conditions employed are: a temperature of 150° C., a hot-pressing pressure of 5 MPa, a preheating time of 300s, a hot-pressing time of 180s and a cooling time of 600s. The thickness of the prepared polypropylene composite material is 1.24 mm.

Comparative Example A7

The co-extruded polypropylene sheets (17 layers) are prepared according to the methods in Example A12, except that the material of component $B_i$ is selected as follows: the components $x_1$-$x_9$ are all a polypropylene random copolymer prepared by Beijing Research Institute of Chemical Industry, SINOPEC, with a melting point of 150° C.; and the molecular weight distributions Mw/Mn of components $x_1$-$x_9$ are all between 7-10, the melt flow rates of components $x_1$-$x_9$ are all between 2-10 g/10 min.

Pellets of polypropylene composition $B_i$ are finally obtained. As tested, the melting point of $B_i$ is 148° C.

The hot-pressing conditions employed are: a temperature of 150° C., a hot-pressing pressure of 5 MPa, a preheating time of 300s, a hot-pressing time of 180s and a cooling time of 600s. The thickness of the prepared polypropylene composite material is 1.24 mm.

Experiment Examples

The polypropylene composite materials obtained in the Examples and Comparative examples above are tested according to the following methods, the results are shown in Table 1:

(1) sheet tensile strength: determined in accordance with the method specified in GB/T1040.1-2018;

(2) drop impact strength: determined in accordance with the method specified in GB/T14153-1993;

(3) interlayer peel strength: determined in accordance with the method specified in GB/T2358-98. Wherein, the thicknesses of the polypropylene composite materials obtained in Examples A1-9, 12, 13 and Comparative examples A1-4 are all close to about 390 μm, in a range of 390 μm±10 μm.

TABLE 1

| No. | Tensile strength (MPa) | Drop impact strength (J) | Peel strength (N/mm) |
| --- | --- | --- | --- |
| Example A1 | 191 | 46.91 | 1.53 |
| Example A2 | 183 | 45.72 | 1.59 |
| Example A3 | 200 | 45.48 | 1.51 |
| Example A4 | 202 | 44.04 | 1.32 |
| Example A5 | 168 | 44.75 | 1.63 |
| Example A6 | 172 | 46.11 | 1.37 |
| Example A7 | 258 | 42.17 | 1.38 |
| Example A8 | 176 | 43.59 | 1.45 |
| Example A9 | 161 | 42.14 | 1.42 |
| Example A10 | 172 | 42.25 | 1.51 |
| Example A11 | 182 | 49.32 | 1.59 |
| Example A12 | 168 | 81.62 | 1.49 |
| Example A13 | 161 | 73.85 | 1.35 |
| Example A14 | 165 | 44.43 | 1.53 |
| Example A15 | 163 | 41.21 | 1.65 |
| Example A16 | 212 | 45.67 | 1.61 |
| Example A17 | 162 | 231.83 | 1.39 |
| Example A18 | 181 | 41.28 | 1.29 |
| Comparative example A1 | 131 | 30.89 | 0.78 |
| Comparative example A2 | 181 | 42.55 | 1.12 |
| Comparative example A3 | 183 | 40.16 | 0.88 |
| Comparative example A4 | 106 | 42.23 | 2.09 |
| Comparative example A5 | 139 | 61.34 | 1.42 |
| Comparative example A6 | 142 | 69.58 | 1.39 |
| Comparative example A7 | 153 | 72.49 | 1.28 |

It can be seen from the results of examples in Table 1, the polypropylene composite materials having a melting point gradient structure prepared according to the invention have good tensile and impact properties, at the same time, also have good interlayer peel strength at lower hot-pressing temperature.

The polypropylene composite materials having a melting point gradient structure described in present invention have tensile strength in machine direction (MD) of ≥160 MPa, interlayer peel strength of ≥1.3 N/mm; when the composite materials are obtained by hot-pressing and fusing of only 5 layers of polypropylene fabrics and have a thickness of only about 390 μm, they have drop impact strength of ≥42J.

It can be seen from the preferred examples A1-3, the polypropylene composite materials having a melting point gradient structure prepared in present invention have tensile strength in machine direction (MD) of ≥180 MPa, interlayer peel strength of ≥1.5 N/mm; when the composite materials are obtained by hot-pressing and fusing of only 5 layers of polypropylene fabrics and are of only about 390 μm, they have drop impact strength of ≥45J.

It can be seen from Comparative examples A1-8, polypropylene composite materials prepared with the schemes outside the scope of present invention lead to a decrease in the performance of the stacked polypropylene sheets or fabrics, resulting in a significant drop in the tensile strength, impact property or interlayer peel strength of the resultant polypropylene composite materials.

Specifically, it can be seen from the comparison of Comparative examples A5-7 and Example $A_{12}$, the tensile strength, impact property and interlayer peel strength of the polypropylene composite materials having a melting point gradient structure of present invention are higher than that of the conventional polypropylene composite materials without the melting point gradient structure. As compared with the conventional polypropylene composite materials without the melting point gradient structure, the inventive polypropylene composite materials having a melting point gradient structure require shorter hot-pressing time or lower hot-pressing temperature are required for processing. It is believed that the reduction of the hot-pressing time or the hot-pressing temperature is able to reduce the damage to the mechanical properties caused by the disorientation of the molecular chains, and in addition, the reduction of the hot-pressing time or the hot-pressing temperature is able to achieve the beneficial effect of reducing the cost and increasing the efficiency.

Example B1

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The component α is a polypropylene homopolymer prepared by Beijing Research Institute of Chemical Industry, SINOPEC, with a melting point of 160° C., a melt flow rate (melt mass-flow rate) of 3.2 g/10 min, and an isotacticity of 97%; the component b is a polypropylene impact copolymer prepared by Beijing Research Institute of Chemical Industry, SINOPEC (at the test condition of 23° C., with an Izod impact strength of 23KJ/m²), with an ethylene content of 11 wt %, a melt flow rate of 2.0 g/10 min and a melting point of 155° C.

The components prepared above are weighted and mixed in proportion, wherein the mass fraction $W_a$ of the component $\alpha$ is 80 weight parts, the mass fraction $W_b$ of the component b is 20 weight parts. β-nucleating agent, with a grade of VP101B, is added at 0.05 weight part. After that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain polypropylene composition pallets, with a melt mass flow rate of 4.6 g/10 min as tested; the melting point of polypropylene composition A is 157° C.

(2) Preparation of Polypropylene Composition B:

the component x is a polypropylene random copolymer prepared by Beijing Research Institute of Chemical Industry, SINOPEC, being an ethylene-propylene-butene terpolymer, with a molecular weight distribution (Mw/Mn) of 7.3, a melting point of 140° C., and a melt flow rate of 6.6 g/10 min; the component γ is a polyolefin elastomer with a grade of 6102 purchased from ExxonMobil company and is an ethylene-propylene copolymer, with an ethylene content of 16 wt %, a melt flow rate at 190° C., 2.16 kg load of 1.4 g/10 min; The components prepared above are weighted and mixed in proportion, wherein the mass fraction Wx of the component x is 85 weight parts, the mass fraction $W_y$ of the component γ is 15 weight parts, other steps are the same as step (1). Pellets of polypropylene composition B are finally obtained, which have a melt mass flow rate of 5.2 g/10 min, and a melting point of 138° C. as tested.

(3) Preparation of the Three-Layer Co-Extruded Polypropylene Sheets:

The pellets of polypropylene composition A and polypropylene composition B prepared in above steps (1) and (2) are dried, after that the polypropylene composition A is added into a core layer extruder of a multi-layer extrusion calendaring machine, and the polypropylene composition B is added into upper and lower surface layer extruders of the multi-layer extrusion calendaring machine.

After the pellets are co-extruded and compounded and flowed out through a die of the extruder, the pellets are sequentially passed through a calendering roller and a pulling roller, and then subjected to solid phase stretching, edge cutting and rolling to prepare the sheet.

Wherein, the temperature of extruding and casting is 230° C., and the temperature of the calendering roller is 55° C. During solid phase stretching, the temperature is 135° C., the stretching rate is 2 m/min, and stretching ratio is 7. The polypropylene sheet (composite film) prepared after stretching and rolling is composed of upper surface layer (film layer B), core layer (film layer A), and lower surface layer (film layer B).

The thickness of the above-mentioned polypropylene sheet (composite film) is 80 μm, wherein the thickness of film layer A accounts for 80% of the total thickness of the sheet.

(4) Preparation of Polypropylene Fabrics:

The three-layer co-extruded polypropylene sheets prepared in above step (3) are divided and cut into oriented polypropylene ribbons having a width of 3 mm by using a high-speed dividing and cutting machine with multi-blades. The oriented ribbons are weaved according to the designed fabric structure by using a commercial weaving machine to obtain plain weaved polypropylene fabrics.

(5) Preparation of Polypropylene Composite Material:

The polypropylene fabrics prepared in above step (4) are stacked sequentially and hot-pressed to prepare the stacked polypropylene sheet. The stacked polypropylene sheet comprises 24 layers of polypropylene fabrics, and the polypropylene fabrics are placed at 90 degree with respect to each other along their respective warp directions. The hot-pressing conditions employed are: a temperature of 150° C., a hot-pressing pressure of 5 MPa, a preheating time of 180s, a hot-pressing time of 180s and a cooling time of 600s. The thickness of the prepared polypropylene composite material is 1.67 mm.

Example B2

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The component $\alpha$ is a polypropylene homopolymer prepared by Beijing Research Institute of Chemical Industry, SINOPEC, with a melting point of 165° C., a melt flow rate of 8.1 g/10 min, and an isotacticity of 97%; the component b is a polypropylene impact copolymer prepared by Beijing Research Institute of Chemical Industry, SINOPEC, at the test condition of 23° C., with an Izod impact strength of $25KJ/m^2$, an ethylene content of 8 wt %, a melt flow rate of 3.2 g/10 min and a melting point of 155° C.

The components prepared above are weighted and mixed in proportion, wherein the mass fraction $W_a$ of the component $\alpha$ is 70 weight parts, the mass fraction $W_b$ of the component b is 30 weight parts. β-nucleating agent, with a grade of VP101B, is added at 0.05 weight part. After that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain polypropylene composition pallets, with a melt mass flow rate of 7.3 g/10 min as tested, and the melting point of polypropylene composition A is 161° C.

(2) Preparation of Polypropylene Composition B:

the component x is a polypropylene random copolymer prepared by Beijing Research Institute of Chemical Industry, SINOPEC, being an ethylene-propylene-butene terpolymer, with a melting point of 134° C., a molecular weight distribution (Mw/Mn) of 7.6, and a melt flow rate of 5.2 g/10 min; the component γ is a polyolefin elastomer with a grade prepared by Beijing Research Institute of Chemical Industry, SINOPEC, being an ethylene-propylene copolymer, with an ethylene content of 15 wt %, a melting point of 105° C., a melt flow rate at 190° C., 2.16 kg load of 9 g/10 min; The components prepared above are weighted and mixed in proportion, wherein the mass fraction Wx of the component x is 80 weight parts, the mass fraction $W_y$ of the component γ is 20 weight parts, other steps are the same as step (1). Pellets of polypropylene composition B are finally obtained, which have a melt mass flow rate of 9.6 g/10 min as tested. The melting point of polypropylene composition B is 130° C.

(3) Preparation of the Three-Layer Co-Extruded Polypropylene Sheets:

The preparation process is the same as the step (3) of Example B1.

(4) Preparation of Polypropylene Fabrics:

The preparation process is the same as the step (4) of Example B1.

(5) Preparation of Polypropylene Composite Material:

The preparation process is the same as the step (5) of Example B1.

The thickness of the prepared polypropylene composite material is similar to that of Example B1.

Example B3

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

Same as Example B1, wherein the mass fraction $W_a$ of the component α is 90 weight parts, the mass fraction $W_b$ of the component b is 10 weight parts. β-nucleating agent, with a grade of VP101B, is added at 0.05 weight part. Pellets of polypropylene composition A are obtained, with a melt mass flow rate of 6.8 g/10 min as tested, and the melting point of polypropylene composition A is 158° C.

(2) Preparation of Polypropylene Composition B:

Same as Example B1, wherein the mass fraction Wx of the component x is 90 weight parts, the mass fraction $W_y$ of the component γ is 10 weight parts. Pellets of polypropylene composition B are finally obtained, with a melt mass flow rate of 8.7 g/10 min as tested, and the melting point of polypropylene composition B is 139° C.

(3) Preparation of the Three-Layer Co-Extruded Polypropylene Sheets:

The preparation process is the same as the step (3) of Example B1.

(4) Preparation of Polypropylene Fabrics:

The preparation process is the same as the step (4) of Example B1.

(5) Preparation of Polypropylene Composite Material:

The preparation process is the same as the step (5) of Example B1.

The thickness of the prepared polypropylene composite material is similar to that of Example B1.

Example B4

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The main steps are the same as Example B1. The thickness of the polypropylene sheet is 80 μm, wherein the thickness of film layer A accounts for 90% of the total thickness of the sheet.

(4) Preparation of Polypropylene Fabrics:

The preparation process is the same as the step (4) of Example B1.

(5) Preparation of Polypropylene Composite Material:

The preparation process is the same as the step (5) of Example B1.

The thickness of the prepared polypropylene composite material is similar to that of Example B1.

Example B5

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The main steps are the same as Example B1. The thickness of the polypropylene sheet is 80 μm, wherein the thickness of film layer A accounts for 70% of the total thickness of the sheet.

(4) Preparation of Polypropylene Fabrics:

The preparation process is the same as the step (4) of Example B1.

(5) Preparation of Polypropylene Composite Material:

The preparation process is the same as the step (5) of Example B1.

The thickness of the prepared polypropylene composite material is similar to that of Example B1.

Example B6

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The preparation process is the same as the step (3) of Example B1.

(4) Preparation of Polypropylene Fabrics:

The main steps are the same as step (4) of Example B1. The oriented ribbons are weaved according to the designed fabric structure by using a commercial weaving machine to obtain satin weaved polypropylene fabrics.

(5) Preparation of Polypropylene Composite Material:

The preparation process is the same as the step (5) of Example B1.

The thickness of the prepared polypropylene composite material is similar to that of Example B1.

Example B7

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The main preparation process is the same as the step (3) of Example B1. Wherein, the stretching ratio of the sheet is 10.

(4) Preparation of Polypropylene Fabrics:

The preparation process is the same as the step (4) of Example B1.

(5) Preparation of Polypropylene Composite Material:

The preparation process is the same as the step (5) of Example B1.

The thickness of the prepared polypropylene composite material is similar to that of Example B1.

Example B8

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The preparation process is the same as the step (3) of Example B1.

(4) Preparation of Polypropylene Fabrics:

The preparation process is the same as the step (4) of Example B1.

(5) Preparation of Polypropylene Composite Material:

The main preparation process is the same as the step (5) of Example B1. Wherein, the polypropylene fabrics are placed at 45 degrees with respect to each other along their respective warp directions.

The thickness of the prepared polypropylene composite material is similar to that of Example B1.

Example B9

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The preparation process is the same as the step (3) of Example B1.

(4) Preparation of Polypropylene Fabrics:

The preparation process is the same as the step (4) of Example B1.

(5) Preparation of Polypropylene Composite Material:

The main preparation process is the same as the step (5) of Example B1. Wherein, the polypropylene fabrics are placed at 0 degree with respect to each other along their respective warp directions.

The thickness of the prepared polypropylene composite material is similar to that of Example B1.

Example B10

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The preparation process is the same as the step (3) of Example B1.

(4) Preparation of Polypropylene Fabrics:

The preparation process is the same as the step (4) of Example B1.

(5) Preparation of Polypropylene Composite Material:

The main steps are the same as Example B1. The stacked polypropylene sheets comprise 2 layers of polypropylene fabrics. The hot-pressing conditions employed are: a temperature of 140° C., a hot-pressing pressure of 2 MPa, a preheating time of 120s, a hot-pressing time of 10s and a cooling time of 300s. The thickness of the prepared polypropylene composite material is 128 μm.

Example B11

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The preparation process is the same as the step (3) of Example B1.

(4) Preparation of Polypropylene Fabrics:

The preparation process is the same as the step (4) of Example B1.

(5) Preparation of Polypropylene Composite Material:

The main steps are the same as Example B1. The stacked polypropylene sheets comprise 100 layers of polypropylene fabrics. The hot-pressing conditions employed are: 159° C., a hot-pressing pressure of 10 MPa, a preheating time of 300s, a hot-pressing time of 300s and a cooling time of 700s.

The thickness of the prepared polypropylene composite material is 7.23 mm.

Example B12

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The preparation process is the same as the step (3) of Example B1.

(4) Preparation of Polypropylene Fabrics:

The preparation process is the same as the step (4) of Example B1.

(5) Preparation of Polypropylene Composite Material:

The main steps are the same as Example B1. Temperature of 155° C., a hot-pressing pressure of 8 MPa, a preheating time of 300s, a hot-pressing time of 300s and a cooling time of 700s. The thickness of the prepared polypropylene composite material is 1.58 mm.

Example B13

The present example is used for illustrating the preparation of the polypropylene compositions, three-layer co-extruded polypropylene sheets, polypropylene fabrics and polypropylene composite material provided in the present invention.

(1) Preparation of Polypropylene Composition A:

The preparation process is the same as the step (1) of Example B1.

(2) Preparation of Polypropylene Composition B:

The preparation process is the same as the step (2) of Example B1.

(3) Preparation of the Three-Layer Co-Extruded Polypropylene Sheets:

The preparation process is the same as the step (3) of Example B1.

(4) Preparation of Polypropylene Composite Material:

Instead of preparing the polypropylene fabrics, the three-layer co-extruded polypropylene sheet obtained in step (3) (replacing the polypropylene fabrics obtained in step (4) in example B1) was subjected to sequential stacking and hot-pressing according to step (5) in example B1. The thickness of the prepared polypropylene composite material is 1.51 mm.

Example B14

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The component $\alpha$ is a polypropylene homopolymer prepared by Beijing Research Institute of Chemical Industry, SINOPEC, with a melting point of 160° C., a melt flow rate (melt mass-flow rate) of 3.2 g/10 min, a melting point of 160° C., and an isotacticity of 97%; the component b is a polypropylene impact copolymer prepared by Beijing Research Institute of Chemical Industry, SINOPEC (at the test condition of 23° C., with an Izod impact strength of 23KJ/m², with an ethylene content of 11 wt %, a melt flow rate of 2.0 g/10 min and a melting point of 155° C.

The components prepared above are weighted and mixed in proportion, wherein the mass fraction $W_a$ of the component $\alpha$ is 80 weight parts, the mass fraction $W_b$ of the component b is 20 weight parts. β-nucleating agent, with a grade of VP101B, is added at 0.05 weight part. After that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain polypropylene composition pallets, with a melt mass flow rate of 4.6 g/10 min as tested; the melting point of polypropylene composition A is 157° C.

(2) Preparation of Polypropylene Composition C:

the component $\alpha$ is a polyolefin elastomer with a grade of 6102 purchased from ExxonMobil company and is an ethylene-propylene copolymer, with an ethylene content of 16 wt % (a melt flow rate at 190° C., 2.16 kg load of 1.4 g/10 min); the component $\beta$ is a polypropylene random copolymer with a grade prepared by Beijing Research Institute of Chemical Industry, SINOPEC, being an ethylene-propylene-butene terpolymer, with a molecular weight distribution (Mw/Mn) of 7.3, a melting point of 140° C., and a melt flow rate of 6.6 g/10 min; the component $\gamma$ is a polypropylene homopolymer prepared by Beijing Research Institute of Chemical Industry, SINOPEC, with a melt flow rate of 3.2 g/10 min, a melting point of 160° C. and an isotacticity of 97%. Wherein the mass fraction $W_\alpha$ of the component $\alpha$ is 45 weight parts, the mass fraction $W_\beta$ of the component $\beta$ is 45 weight parts, $W_\gamma$ is 10 weight parts, after that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain polypropylene composition pallets C, with a melt mass flow rate of 6.9 g/10 min as tested, and the melting point of polypropylene composition C is 145° C.

(3) Preparation of Polypropylene Composition B:

the component x is a polypropylene random copolymer prepared by Beijing Research Institute of Chemical Industry, SINOPEC, being an ethylene-propylene-butene terpolymer, with a molecular weight distribution (Mw/Mn) of 7.3, a melting point of 140° C., and a melt flow rate of 6.6 g/10 min; the component $\gamma$ is a polyolefin elastomer with a grade of 6102 purchased from ExxonMobil company and is an ethylene-propylene copolymer, with an ethylene content of 16 wt % (a melt flow rate at 190° C., 2.16 kg load of 1.4 g/10 min).

The components prepared above are weighted and mixed in proportion, wherein the mass fraction Wx of the component x is 85 weight parts, the mass fraction $W_\gamma$ of the component $\gamma$ is 15 weight parts, other steps are the same as step (1). Pellets of polypropylene composition B are finally obtained, which have a melt mass flow rate of 5.2 g/10 min as tested; the melting point of polypropylene composition B is 138° C.

(4) Preparation of the Five-Layer Co-Extruded Polypropylene Composite Material Sheets:

The pellets of polypropylene composition A, polypropylene composition C and polymer B prepared in above steps (1) and (2) are dried, after that the polypropylene composition A is added into a core layer extruder of a multi-layer extrusion calendaring machine, the polypropylene composition C is added into middle layer extruders of the multi-layer extrusion calendaring machine, and the polypropylene composition B is added into upper and lower surface layer extruders of the multi-layer extrusion calendaring machine. After the pellets are co-extruded and compounded and flowed out through a die of the extruder, the pellets are sequentially passed through a calendering roller and a pulling roller, and then subjected to solid phase stretching, edge cutting and rolling to prepare the sheets described. Wherein, the temperature of extruding and casting is 230° C., and the temperature of the calendering roller is 60° C. During solid phase stretching, the temperature is 138° C., the stretching rate is 2 m/min, and stretching ratio is 7.

The polypropylene composite material sheet (composite films) prepared after stretching and rolling is composed of upper surface layer (film layer B), middle layer (film layer C), core layer (film layer A), middle layer (film layer C) and lower surface layer (film layer B). The thickness of the polypropylene composite material sheet is 80 μm, wherein the thickness of film layer A accounts for 80% of the total thickness of the sheet, the thickness of film C accounts for 10% of the total thickness of the sheet and the thickness of film B accounts for 10% of the total thickness of the sheet.

(5) Preparation of Polypropylene Fabrics:

The five-layer co-extruded polypropylene composite material sheets prepared in above step (4) are divided into oriented polypropylene ribbons having a width of 3 mm by using a high-speed dividing and cutting machine with multi-blades. The oriented ribbons are weaved according to the designed fabric structure by using a commercial weaving machine to obtain plain weaved polypropylene fabrics.

(6) Preparation of Polypropylene Composite Material:

The polypropylene fabrics prepared in above step (5) are stacked sequentially and hot-pressed to prepare the stacked polypropylene composite material sheet. The stacked polypropylene composite material sheet comprises 24 layers of polypropylene fabrics, and the polypropylene fabrics are placed at 90 degree with respect to each other along their respective warp directions. The hot-pressing conditions employed are: a temperature of 153° C., a hot-pressing pressure of 5 MPa, a preheating time of 300s, a hot-pressing time of 180s and a cooling time of 600s.

The thickness of the prepared polypropylene composite material is 1.82 mm.

Example B15

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The component α is a polypropylene homopolymer prepared by Beijing Research Institute of Chemical Industry, SINOPEC, with a melting point of 165° C., a melt flow rate of 8.1 g/10 min, and an isotacticity of 97%; the component b is a polypropylene impact copolymer prepared by Beijing Research Institute of Chemical Industry, SINOPEC, at the test condition of 23° C., with an Izod impact strength of 25KJ/m², an ethylene content of 8 wt %, a melt flow rate of 3.2 g/10 min and a melting point of 155° C. The components prepared above are weighted and mixed in proportion, wherein the mass fraction $W_a$ of the component α is 70 weight parts, the mass fraction $W_b$ of the component b is 30 weight parts. β-nucleating agent, with a grade of VP101B, is added at 0.05 weight part. After that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain polypropylene composition pallets, with a melt mass flow rate of 7.3 g/10 min as tested. The melting point of polypropylene composition A is 161° C.

(2) Preparation of Polypropylene Composition C:

the component α is a polyolefin elastomer with a grade prepared by Beijing Research Institute of Chemical Industry, SINOPEC, being an ethylene-propylene copolymer, with an ethylene content of 15 wt %, a melting point of 105° C., (a melt flow rate at 190° C., 2.16 kg load of 9 g/10 min); the component β is a polypropylene random copolymer prepared by Beijing Research Institute of Chemical Industry, SINOPEC, being an ethylene-propylene-butene terpolymer, with a molecular weight distribution (Mw/Mn) of 7.6, a melting point of 134° C., and a melt flow rate of 5.2 g/10 min; the component γ is a polypropylene homopolymer prepared by Beijing Research Institute of Chemical Industry, SINOPEC, with a melting point of 165° C., a melt flow rate of 8.1 g/10 min, and an isotacticity of 97%. Wherein the mass fraction $W_\alpha$ of the component α is 55 weight parts, the mass fraction $W_\beta$ of the component β is 40 weight parts, $W_\gamma$ is 5 weight parts, after that, the mixture is added into a high-speed stirrer and mixed uniformly, the mixed material is added into the feeder of a twin-screw extruder produced by W&P company, through which the material enters the twin-screw. During the processing, the temperature of the screw is maintained between 200-230° C., the material is melted and mixed uniformly via the screw, extruded, pelleted and dried to obtain polypropylene composition pallets C, with a melt mass flow rate of 7.8 g/10 min as tested, and the melting point of polypropylene composition C is 156° C.

(3) Preparation of Polypropylene Composition B:

the component x is a polypropylene random copolymer prepared by Beijing Research Institute of Chemical Industry, SINOPEC, being an ethylene-propylene-butene terpolymer, with a molecular weight distribution (Mw/Mn) of 7.6, a melting point of 134° C., and a melt flow rate of 5.2 g/10 min; the component y the component α is a polyolefin elastomer with a grade prepared by Beijing Research Institute of Chemical Industry, SINOPEC, being an ethylene-propylene copolymer with an ethylene content of 15 wt %, a melting point of 105° C., (a melt flow rate at 190° C., 2.16 kg load of 9 g/10 min). The components prepared above are weighted and mixed in proportion, wherein the mass fraction $W_x$ of the component x is 80 weight parts, the mass fraction $W_y$ of the component $\gamma$ is 20 weight parts, other steps are the same as step (1). Pellets of polypropylene composition B are finally obtained, which have a melt mass flow rate of 9.6 g/10 min as tested, and the melting point of polypropylene composition B is 130° C.

(4) Preparation of the Five-Layer Co-Extruded Polypropylene Composite Material Sheets:

The preparation process is the same as the step (4) of Example B14.

(5) Preparation of Polypropylene Fabrics:

The preparation process is the same as the step (5) of Example B14.

(6) Preparation of Polypropylene Composite Material:

The preparation process is the same as the step (6) of Example B14.

The thickness of the prepared polypropylene composite material is similar to that of Example B14.

Example B16

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

Same as Example B1, wherein the mass fraction $W_a$ of the component $\alpha$ is 90 weight parts, the mass fraction $W_b$ of the component b is 10 weight parts. $\beta$-nucleating agent, with a grade of VP101B, is added at 0.05 weight part. Pellets of polypropylene composition A are obtained. As tested, the melt mass flow rate thereof is 6.8 g/10 min. The melting point of polypropylene composition A is 158° C.

(2) Preparation of Polypropylene Composition C:

Same as Example B1, wherein the mass fraction $W_\alpha$ of the component $\alpha$ is 35 weight parts, the mass fraction $W_\beta$ of the component $\beta$ is 55 weight parts, $W_\gamma$ is 10 weight parts. Pellets of polypropylene composition C are finally obtained, which have a melt mass flow rate of 7.3 g/10 min as tested, and the melting point of polypropylene composition C is 142° C.

(3) Preparation of Polypropylene Composition B:

Same as Example B1, wherein the mass fraction Wx of the component x is 90 weight parts, the mass fraction $W_y$ of the component $\gamma$ is 10 weight parts. Pellets of polypropylene composition B are finally obtained, which have a melt mass flow rate of 8.7 g/10 min as tested, and the melting point of polypropylene composition B is 139° C.

(4) Preparation of the Five-Layer Co-Extruded Polypropylene Composite Material Sheets:

The preparation process is the same as the step (4) of Example B14.

(5) Preparation of Polypropylene Fabrics:

The preparation process is the same as the step (5) of Example B14.

(6) Preparation of Polypropylene Composite Material:

The preparation process is the same as the step (6) of Example B14.

The thickness of the prepared polypropylene composite material is similar to that of Example B14.

Example B17

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The main steps are the same as Example B14, wherein the thickness of film layer A accounts for 90% of the total thickness of the sheet, the thickness of film C accounts for 5% of the total thickness of the sheet and the thickness of film B accounts for 5% of the total thickness of the sheet.

(5) Preparation of Polypropylene Fabrics:

The preparation process is the same as the step (5) of Example B14.

(6) Preparation of Polypropylene Composite Material:

The preparation process is the same as the step (6) of Example B14.

The thickness of the prepared polypropylene composite material is similar to that of Example B14.

Example B18

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The main steps are the same as Example B14. The thickness of the polypropylene composite material sheets is 80 µm, wherein the thickness of film layer A accounts for 70% of the total thickness of the sheet, the thickness of film C accounts for 15% of the total thickness of the sheet and the thickness of film B accounts for 15% of the total thickness of the sheet.

(5) Preparation of Polypropylene Fabrics:

The preparation process is the same as the step (5) of Example B14.

(6) Preparation of Polypropylene Composite Material:

The preparation process is the same as the step (6) of Example B14.

The thickness of the prepared polypropylene composite material is similar to that of Example B14.

Example B19

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The preparation process is the same as the step (4) of Example B14.

(5) Preparation of Polypropylene Fabrics:

The main steps are the same as step (5) of Example B14. The oriented ribbons are weaved according to the designed fabric structure by using a commercial weaving machine to obtain satin weaved polypropylene fabrics.

(6) Preparation of Polypropylene Composite Material:

The preparation process is the same as the step (6) of Example B14.

The thickness of the prepared polypropylene composite material is similar to that of Example B14.

Example B20

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The main preparation process is the same as the step (4) of Example B14. Wherein, the stretching ratio of the sheet is 10.

(5) Preparation of Polypropylene Fabrics:

The preparation process is the same as the step (5) of Example B14.

(6) Preparation of Polypropylene Composite Material:

The preparation process is the same as the step (6) of Example B14.

The thickness of the prepared polypropylene composite material is similar to that of Example B14.

Example B21

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The preparation process is the same as the step (4) of Example B14.

(5) Preparation of Polypropylene Fabrics:

The preparation process is the same as the step (5) of Example B14.

(6) Preparation of Polypropylene Composite Material:

The main preparation process is the same as the step (6) of Example B14. Wherein, the polypropylene fabrics are placed at 45 degrees with respect to each other along their respective warp directions.

The thickness of the prepared polypropylene composite material is similar to that of Example B14.

Example B22

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The preparation process is the same as the step (4) of Example B14.

(5) Preparation of Polypropylene Fabrics:

The preparation process is the same as the step (5) of Example B14.

(6) Preparation of Polypropylene Composite Material:

The main preparation process is the same as the step (6) of Example B14. Wherein, the polypropylene fabrics are placed at 0 degree with respect to each other along their respective warp directions.

The thickness of the prepared polypropylene composite material is similar to that of Example B14.

Example B23

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The preparation process is the same as the step (4) of Example B14.

(5) Preparation of Polypropylene Fabrics:

The preparation process is the same as the step (5) of Example B14.

(6) Preparation of Polypropylene Composite Material:

The main preparation process is the same as the step (6) of Example B14. The stacked polypropylene composite material sheet comprises 2 layers of polypropylene fabrics. The hot-pressing conditions employed are: a temperature of 145° C., a hot-pressing pressure of 2 MPa, a preheating time of 150s, a hot-pressing time of 60s and a cooling time of 300s. The thickness of the prepared polypropylene composite material is 136 μm.

Example B24

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The preparation process is the same as the step (4) of Example B14.

(5) Preparation of Polypropylene Fabrics:

The preparation process is the same as the step (5) of Example B14.

(6) Preparation of Polypropylene Composite Material:

The main preparation process is the same as the step (6) of Example B14. The stacked polypropylene composite material sheet comprises 100 layers of polypropylene fabrics. The hot-pressing conditions employed are: 159° C., a hot-pressing pressure of 10 MPa, a preheating time of 420s, a hot-pressing time of 300s and a cooling time of 700s. The thickness of the prepared polypropylene composite material is 7.45 mm.

Example B25

The present example is used for illustrating the preparation of the polypropylene composition, five-layer co-extruded polypropylene composite material sheets, polypropylene fabrics and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The preparation process is the same as the step (4) of Example B14.

(5) Preparation of Polypropylene Fabrics:

The preparation process is the same as the step (5) of Example B14.

(6) Preparation of Polypropylene Composite Material:

The main preparation process is the same as the step (6) of Example B14. Temperature of 155° C., a hot-pressing pressure of 8 MPa, a preheating time of 300s, a hot-pressing time of 300s and a cooling time of 700s. The thickness of the prepared polypropylene composite material is 1.61 mm.

Example B26

The present example is used for illustrating the preparation of the polypropylene composition, five-layer co-extruded polypropylene sheet, polypropylene fabric and polypropylene composite materials provided in the present invention.

(1) Preparation of Polypropylene Composition A:

The preparation process is the same as the step (1) of Example B14.

(2) Preparation of Polypropylene Composition C:

The preparation process is the same as the step (2) of Example B14.

(3) Preparation of Polypropylene Composition B:

The preparation process is the same as the step (3) of Example B14.

(4) Preparation of the Five-Layer Co-Extruded Polypropylene Composite Material Sheets:

The preparation process is the same as the step (4) of Example B14.

(5) Preparation of Polypropylene Composite Material:

The main preparation process is the same as the step (6) of Example B14. Except that instead of preparing the polypropylene fabrics, the five-layer co-extruded polypropylene sheets obtained in step (4) above (replacing the polypropylene fabrics in example B14) are subjected to sequential stacking hot-pressing.

The thickness of the prepared polypropylene composite material is similar to that of Example B14.

Example B27

The five-layer co-extruded polypropylene sheets are prepared according to the methods in Example B14, except that the material of component A is selected as follows: the component α is a polypropylene homopolymer prepared by Beijing Research Institute of Chemical Industry, SINOPEC, with a melting point of 155° C., a melt flow rate of 14.3 g/10 min, and an isotacticity of 96%.

The thickness of the prepared polypropylene composite material is similar to that of Example B14.

Example B28

The five-layer co-extruded polypropylene sheets are prepared according to the methods in Example B14, except that the material of component B is selected as follows: the component x is a polypropylene random copolymer prepared by Beijing Research Institute of Chemical Industry, SINOPEC, being an ethylene-propylene-butene terpolymer, with a molecular weight distribution (Mw/Mn) of 10.5, a melting point of 130° C., and a melt flow rate of 9.2 g/10 min; The thickness of the prepared polypropylene composite material is similar to that of Example B14.

Comparative Example B1

The three-layer co-extruded polypropylene sheets are prepared according to the methods in Example B1, except that polypropylene composition A alone is extruded and cast to prepare a single-layer film with a film thickness of 80 μm. The polypropylene fabrics and polypropylene composite material are prepared according to the methods in Example B1.

The thickness of the prepared polypropylene composite material is similar to that of Example B1.

Comparative Example B2

The three-layer co-extruded polypropylene sheets are prepared according to the methods in Example B1, except that polypropylene composition B alone is extruded and cast to prepare a single-layer film with a film thickness of 80 μm. The polypropylene fabrics and polypropylene composite material are prepared according to the methods in Example B1.

The thickness of the prepared polypropylene composite material is similar to that of Example B1.

Comparative Example B3

The three-layer co-extruded polypropylene sheets are prepared according to the methods in Example B1, except that the polypropylene composition A contains only component b. The polypropylene fabrics and polypropylene composite material are prepared according to the methods in Example B1.

The thickness of the prepared polypropylene composite material is similar to that of Example B1.

Comparative Example B4

The three-layer co-extruded polypropylene sheets are prepared according to the methods in Example B1, except that the polypropylene composition B contains only component y. The polypropylene fabrics and polypropylene composite material are prepared according to the methods in Example B1.

The thickness of the prepared polypropylene composite material is similar to that of Example B1.

Comparative Example B5

The three-layer co-extruded polypropylene sheets are prepared according to the methods in Example B1, except that the thickness of film layer A accounts for 95% of the total thickness of the sheet. The polypropylene fabrics and polypropylene composite material are prepared according to the methods in Example B1.

The thickness of the prepared polypropylene composite material is similar to that of Example B1.

Comparative Example B6

The three-layer co-extruded polypropylene sheets are prepared according to the methods in Example B1, except that the thickness of film layer A accounts for 50% of the total thickness of the sheet. The polypropylene fabrics and polypropylene composite material are prepared according to the methods in Example B1.

The thickness of the prepared polypropylene composite material is similar to that of Example B1.

Comparative Example B7

The five-layer co-extruded polypropylene composite material sheets are prepared according to the methods in Example B14, except that polypropylene composition A alone is extruded and cast to prepare a single-layer film with a film thickness of 80 μm. The polypropylene fabrics and polypropylene composite material are prepared according to the methods in Example B1.

The thickness of the prepared polypropylene composite material is similar to that of Example B14.

Comparative Example B8

The five-layer co-extruded polypropylene composite material sheets are prepared according to the methods in Example B14, except that polypropylene composition C alone is extruded and cast to prepare a single-layer film with a film thickness of 80 μm. The polypropylene fabrics and polypropylene composite material are prepared according to the methods in Example B1.

The thickness of the prepared polypropylene composite material is similar to that of Example B14.

Comparative Example B9

The five-layer co-extruded polypropylene composite material sheets are prepared according to the methods in Example B14, except that polypropylene composition B alone is extruded and cast to prepare a single-layer film with a film thickness of 80 μm. The polypropylene fabrics and polypropylene composite material are prepared according to the methods in Example B1.

The thickness of the prepared polypropylene composite material is similar to that of Example B14.

Comparative Example B10

The five-layer co-extruded polypropylene composite material sheets are prepared according to the methods in Example B14, except that the polypropylene composition A contains only component b. The polypropylene fabrics and polypropylene composite material are prepared according to the methods in Example B1.

The thickness of the prepared polypropylene composite material is similar to that of Example B14.

Comparative Example B11

The five-layer co-extruded polypropylene composite material sheets are prepared according to the methods in Example B14, except that the polypropylene composition B contains only component y. The polypropylene fabrics and polypropylene composite material are prepared according to the methods in Example B1.

The thickness of the prepared polypropylene composite material is similar to that of Example B14.

Comparative Example B12

The five-layer co-extruded polypropylene composite material sheets are prepared according to the methods in Example B14, except that the thickness of film layer A accounts for 95% of the total thickness of the sheet, the thickness of film C accounts for 2.5% of the total thickness of the sheet and the thickness of film B accounts for 2.5% of the total thickness of the sheet. The polypropylene fabrics and polypropylene composite material are prepared according to the methods in Example B1.

The thickness of the prepared polypropylene composite material is similar to that of Example B14.

Comparative Example B13

The five-layer co-extruded polypropylene composite material sheets are prepared according to the methods in Example B14, except that the thickness of film layer A accounts for 50% of the total thickness of the sheet, the thickness of film C accounts for 25% of the total thickness of the sheet and the thickness of film B accounts for 25% of the total thickness of the sheet. The polypropylene fabrics and polypropylene composite material are prepared according to the methods in Example B1.

The thickness of the prepared polypropylene composite material is similar to that of Example B14.

Experiment Examples

The polypropylene composite materials obtained in the Examples and Comparative examples above are tested according to the following methods, the results are shown in Tables 2& 3:

(1) tensile strength: prepared and determined in accordance with the method specified in GB/T1040.1-2018;

(2) interlayer peel strength: prepared and determined in accordance with the method specified in GB/T2358-98.

(3) drop impact strength: determined in accordance with the method specified in GB/T14153-1993. Wherein, the thicknesses of the polypropylene composite materials obtained in Examples B1-9 and Comparative examples B1-6 are all close to about 1.6 mm, in a range of 1.6 mm±1 mm. The thicknesses of the polypropylene composite materials obtained in Examples B14-22, B26 and Comparative examples B7-13 are all close to about 1.8 mm, in a range of 1.8 mm±1 mm.

TABLE 2

| No. | Tensile strength (MPa) | Drop impact strength (J) | Peel strength (N/mm) |
|---|---|---|---|
| Example B1 | 187 | 246.81 | 1.23 |
| Example B2 | 176 | 242.16 | 1.34 |
| Example B3 | 194 | 240.83 | 1.21 |
| Example B4 | 201 | 249.14 | 1.07 |
| Example B5 | 164 | 257.68 | 1.45 |
| Example B6 | 171 | 273.98 | 1.12 |
| Example B7 | 257 | 228.96 | 1.14 |
| Example B8 | 176 | 243.71 | 1.24 |
| Example B9 | 154 | 228.96 | 1.22 |
| Example B10 | 205 | 20.76 | 1.28 |
| Example B11 | 158 | 999.31 | 1.21 |
| Example B12 | 171 | 244.49 | 1.36 |
| Example B13 | 195 | 241.38 | 1.38 |
| Comparative example B1 | 198 | 153.68 | 0.56 |
| Comparative example B2 | 89 | 241.38 | 2.47 |
| Comparative example B3 | 136 | 222.75 | 1.28 |
| Comparative example B4 | 178 | 231.29 | 0.87 |
| Comparative example B5 | 179 | 202.57 | 0.63 |
| Comparative example B6 | 104 | 227.41 | 1.98 |

60

It can be seen from the results of examples in Table 3, the polypropylene composite materials prepared according to the invention have good tensile and impact properties, at the same time, also have good interlayer peel strength at lower hot-pressing temperature. The polypropylene composite material sheets described in present invention have tensile strength in machine direction (MD) of ≥150 MPa, interlayer peel strength of ≥1 N/mm; when the polypropylene composite materials are obtained by hot-pressing and fusing of 24 layers of polypropylene fabrics and have a thickness of about 1.6 mm, they have a drop impact strength of ≥228 J.

It can be seen from the preferred examples B1-3, the polypropylene composite materials prepared in present invention have tensile strength in machine direction (MD) of ≥170 MPa, interlayer peel strength of ≥1.2 N/mm; when the polypropylene composite materials are obtained by hot-pressing and fusing of 24 layers of polypropylene fabrics and have a thickness of about 1.6 mm, they have a drop impact strength is ≥240 J.

It can be seen from Comparative examples B1-6, only adopting a single-layer sheet structure or adopting an interlayer ratio outside the scope of the inventive examples lead to a decrease in the performance of the stacked polypropylene sheets or fabrics, resulting in a significant drop in the tensile strength, impact property or interlayer peel strength of the resultant polypropylene composite materials.

TABLE 3

| | Tensile strength in machine direction (MPa) | Drop impact strength (J) | Interlayer peel strength (N/mm) |
|---|---|---|---|
| Example B14 | 178 | 256.91 | 1.31 |
| Example B15 | 171 | 280.97 | 1.36 |
| Example B16 | 185 | 251.59 | 1.30 |
| Example B17 | 196 | 264.67 | 1.13 |
| Example B18 | 161 | 273.98 | 1.51 |
| Example B19 | 168 | 296.49 | 1.16 |
| Example B20 | 245 | 244.49 | 1.19 |
| Example B21 | 171 | 257.68 | 1.29 |
| Example B22 | 151 | 246.81 | 1.28 |
| Example B23 | 198 | 21.21 | 1.31 |
| Example B24 | 151 | 1009.12 | 1.25 |
| Example B25 | 165 | 249.14 | 1.39 |
| Example B26 | 181 | 245.31 | 1.42 |
| Example B27 | 148 | 242.68 | 1.22 |
| Example B28 | 154 | 223.76 | 1.29 |
| Comparative example B7 | 198 | 166.09 | 0.56 |
| Comparative example B8 | 76 | 233.62 | 2.98 |
| Comparative example B9 | 89 | 249.14 | 2.47 |
| Comparative example B10 | 131 | 242.16 | 1.29 |
| Comparative example B11 | 172 | 244.49 | 0.95 |
| Comparative example B12 | 171 | 228.19 | 0.71 |
| Comparative example B13 | 98 | 247.59 | 2.09 |

It can be seen from the results of examples in Table 3, the polypropylene composite materials prepared according to the invention have good tensile and impact properties, at the same time, also have good interlayer peel strength at lower hot-pressing temperature. When the polypropylene composite material sheets have a sheet structure of BCACB, the polypropylene composite materials described in present invention have tensile strength in machine direction (MD) of ≥150 MPa, interlayer peel strength of ≥1.1 N/mm; when the polypropylene composite materials are obtained by hot-pressing and fusing of 24 layers of polypropylene fabrics and have a thickness of about 1.8 mm, they have a drop impact strength of ≥240J.

It can be seen from the preferred examples B14-16, the polypropylene composite materials prepared in present invention have tensile strength in machine direction (MD) of $\geq 170$ MPa, interlayer peel strength of $\geq 1.3$ N/mm; when the polypropylene composite materials are obtained by hot-pressing and fusing of 24 layers of polypropylene fabrics and have a thickness of about 1.8 mm, they have a drop impact strength is $\geq 250$J. It can be seen from Comparative examples B7-13, only adopting a single-layer film structure or adopting a film layer ratio outside the scope of the inventive examples lead to a decrease in the performance of the stacked polypropylene sheets or fabrics, resulting in a significant drop in the tensile strength, impact property or interlayer peel strength of the resultant polypropylene composite materials.

Various examples of the present invention have been described above, the foregoing description is exemplary, not exhaustive, and is not limited to the disclosed examples. Many modifications and alterations will be apparent to those of ordinary skill in the art, without departing from the scope and spirit of the described examples.

Neither the endpoints nor any values of the ranges disclosed herein are limited to such precise ranges or values, and it is understood that these ranges or values comprise values approaching these ranges or values. For numerical ranges, one or more new numerical ranges can be obtained by combining the endpoints of each range with each other, the endpoint of each range with the individual point value, and the individual point values with each other, and these values ranges should be considered as specifically disclosed herein.

The invention claimed is:

1. A polypropylene composite material, comprising a plurality of polypropylene sheet layer unit groups that are sequentially stacked; each polypropylene sheet layer unit group comprises at least one same or different polypropylene sheet layer units, and each polypropylene sheet layer unit comprises a core layer $A_i$ and outer layers $B_i$ and $B'_i$ located on both sides of the core layer $A_i$, with a structure of $B_iA_iB'_i$; the structure of the polypropylene composite material is group n, . . . group i, . . . group 2, group 1, group 2, . . . group i, . . . group n, from bottom to top, the total number of the stacked groups of the polypropylene sheet layer unit groups is 2n−1; i and n are both integers not less than 2, and i≤n;

wherein, in the polypropylene sheet layer unit, the core layer $A_i$ contains a polypropylene composition $A_i$, the outer layer $B_i$ is the same as or different from the outer layer $B'_i$, the outer layer $B_i$ contains the polypropylene composition $B_i$, and the outer layer $B'_i$ contains the polypropylene composition $B'_i$, the melting point of the polypropylene composition $A_i$ is greater than the melting point of the polypropylene composition $B_i$ and of the polypropylene composition $B'_i$; the average value of the melting points of all outer layers in group i is greater than the average value of the melting points of all outer layers in group i−1.

2. The polypropylene composite material according to claim 1, characterized in that:

the difference between the melting point of polypropylene composition $A_i$ and the melting point of polypropylene composition $B_i$, and the difference between the melting point of polypropylene composition $A_i$ and the melting point of polypropylene composition $B'_i$, are each greater than or equal to 5° C.; and/or the differences between the average value of the melting points of all outer layers in group i and the average value of the melting points of all outer layers in group i−1, same or different, are each 1-40° C.

3. The polypropylene composite material according to claim 1, characterized in that: 2≤n≤100; and/or each of the polypropylene sheet layer unit groups, independently from each other, comprises 1 to 10, same or different polypropylene sheet layer units.

4. The polypropylene composite material according to claim 1, characterized in that:

the polypropylene sheet layer unit also comprises intermediate layers $C_i$ and $C'_i$, and the structure of the polypropylene sheet layer unit is $B_iC_iA_iC'_iB'_i$; the intermediate layer $C_i$ is the same as or different from the intermediate layer $C'_i$, the intermediate layer $C_i$ contains a polypropylene composition $C_i$, and the intermediate layer $C'_i$ contains a polypropylene composition $C'_i$; the melting point of the polypropylene composition $A_i$ is greater than the melting point of the polypropylene composition $C_i$ and of the polypropylene composition $C'_i$.

5. The polypropylene composite material according to claim 1, characterized in that:

the thickness of the core layer $A_i$ in each polypropylene sheet layer unit accounts for 51%-89% of the total thickness, based on the total thickness of each polypropylene sheet layer unit.

6. The polypropylene composite material according to claim 1, characterized in that:

the polypropylene composition $A_i$ comprises one or more of polypropylene homopolymer, polypropylene random copolymer and polypropylene impact copolymer; and/or the polypropylene composition $B_i$ and $B'_i$ each comprise one or more of polypropylene homopolymer, polypropylene random copolymer and polypropylene impact copolymer; and optionally, a thermal bonding enhancer $y_i$.

7. The polypropylene composite material according to claim 4, characterized in that:

the polypropylene composition $C_i$ and $C'_i$ each comprise one or more of polypropylene homopolymer, polypropylene random copolymer and polypropylene impact copolymer; and optionally, a thermal bonding enhancer $z_i$.

8. The polypropylene composite material according to claim 1, characterized in that:

the polypropylene composition $A_i$ comprises polypropylene homopolymer $a_i$ and polypropylene impact copolymer $b_i$;

the polypropylene composition $B_i$, the polypropylene composition $B'_i$ each comprise polypropylene random copolymer $x_1$ and a thermal bonding enhancer $y_i$.

9. The polypropylene composite material according to claim 4, characterized in that:

the polypropylene composition $C_i$, the polypropylene composition $C'_i$ each comprise polypropylene random copolymer $\beta_i$ and polypropylene homopolymer $\gamma_i$ and a thermal bonding enhancer $z_i$.

10. The polypropylene composite material according to claim 8, characterized in that:

the polypropylene homopolymer $a_i$ has:

a melting point of 150-170° C.; and/or a melt flow rate at 230° C., 2.16 kg load of 0.5-50 g/10 min; and/or an isotacticity (mm) not less than 96%; and/or the polypropylene impact copolymer $b_i$ has a melting point of 150-170° C.; and/or the monomer copolymerized with propylene in the polypropylene impact copolymer $b_i$ is ethylene or butene; and/or the polypropylene impact copolymer $b_i$ has a melt flow rate at 230° C., 2.16 kg load of 0.5-50 g/10 min; and/or the polypropylene impact copolymer $b_i$ has an Izod impact strength no less than 20 KJ/m$^2$; and/or the polypropylene random copolymer $x_i$ has:

a melting point of 110-150° C.; and/or a melt flow rate at 230° C., 2.16 kg load of 0.5-50 g/10 min; and/or a molecular weight distribution Mw/Mn of 5-12; and/or the polypropylene random copolymer $x_i$ is a copolymer of propylene with ethylene and/or butene; and/or the thermal bonding enhancer $y_i$ has:

a melting point or viscous flow temperature of 70-110° C.; and/or a melt flow rate at 190° C., 2.16 kg load of 0.5-50 g/10 min; and/or the thermal bonding enhancer $y_i$ is selected from one or more of polyolefin elastomer, ethylene-propylene-diene-terpolymer rubber, SEBS, SBS, EVA, petroleum resin.

11. The polypropylene composite material according to claim 9, characterized in that:

the polypropylene homopolymer $\gamma_i$ has:

a melting point of 150-170° C.; and/or a melt flow rate at 230° C., 2.16 kg load of 0.5-50 g/10 min; and/or an isotacticity (mm) not less than 96%; and/or the polypropylene random copolymer $\beta_i$ has:

a melting point of 110-150° C.; and/or a melt flow rate at 230° C., 2.16 kg load of 0.5-50 g/10 min; and/or a molecular weight distribution Mw/Mn of 5-12; and/or the polypropylene random copolymer $\beta_i$ is a copolymer of propylene with ethylene and/or butene; and/or the thermal bonding enhancer $z_i$ has:

a melting point or viscous flow temperature of 70-110° C.; and/or a melt flow rate at 190° C. 2.16 kg load of 0.5-50 g/10 min; and/or the thermal bonding enhancer $z_i$ is selected from one or more of polyolefin elastomer, ethylene-propylene-diene-terpolymer rubber, SEBS, SBS, EVA, petroleum resin.

12. The polypropylene composite material according to claim 11, characterized in that:

the polyolefin elastomer is an elastomer of ethylene copolymerized with propylene and/or α-olefin; and/or the petroleum resin is C5 and/or C9 hydrogenated petroleum resin with a softening point of 100-150° C.

13. The polypropylene composite material according to claim 6, characterized in that:

the polypropylene composition $A_i$ also comprises a β-nucleating agent;

the β-nucleating agent is selected from at least one of polycyclic aromatic hydrocarbons, Group IIA two-component complexes, aromatic diamides, rare earth compounds and cyclic dicarboxylate nucleating agents; and/or the content of the β-nucleating agent in the polypropylene composition $A_i$ is 0.01-0.5 parts by weight, based on 100 parts by weight of the total amount of the polypropylene composition $A_i$.

14. The polypropylene composite material according to claim 1, characterized in that:

the polypropylene sheet layer unit is a polypropylene sheet and/or polypropylene fabric.

15. The polypropylene composite material according to claim 14, characterized in that: the various polypropylene sheet layer units are connected by hot-pressing bonding.

16. A method for preparing a polypropylene composite material according to claim 1, comprising the steps of: sequentially stacking 2n–1 polypropylene sheet layer unit groups in a sequence of group n, . . . group i, . . . group 2, group 1, group 2, . . . group i, . . . group n, and then performing hot-pressing and fusing.

17. The preparation method according to claim 16, characterized in that, comprising the steps of:

(1) polypropylene composition $A_i$, polypropylene composition $B_i$, polypropylene composition $B'_i$, optional polypropylene composition $C_i$, optional polypropylene composition $C'_i$ are co-extrusion molded, cast or calendered, and stretched according to $B_iA_iB'_i$ structure or $B_iC_iA_iC'_iB'_i$ structure to obtain a polypropylene sheet;

(2) optionally, the polypropylene sheet is divided and cut, and then weaved to obtain a polypropylene fabric of BiA: B'$_i$ structure or $B_iC_iA_iC'_iB'_i$ structure;

(3) the polypropylene sheets and/or the polypropylene fabrics are sequentially stacked, hot-pressed and fused, and then cooled and shaped to form the polypropylene composite material.

18. The preparation method according to claim 17, characterized in that:

the preparation of the polypropylene composition $A_i$ in the step (1) comprises melt blending the components comprising at least one of the polypropylene homopolymer, polypropylene random copolymer and polypropylene impact copolymer; and/or the preparation of the polypropylene composition $B_i$, the polypropylene composition $B'_i$ in the step (1) comprises melt blending the components comprising at least one of the polypropylene homopolymer, polypropylene random copolymer and polypropylene impact copolymer; and/or the preparation of the polypropylene composition $C_i$, the polypropylene composition $C'_i$ in the step (1) comprises melt blending the components comprising at least one of the polypropylene homopolymer, polypropylene random copolymer and polypropylene impact copolymer; and/or the temperatures of the co-extrusion molding and casting in the step (1) are independently selected from 190-240° C.; and/or the temperature of the calendering roller in the step (1) is 50-70° C.; and/or the temperature of the stretching in the step (1) is 90-165° C.; and/or the stretching ratio in the step (1) is 1-15.

19. The preparation method according to claim 17, characterized in that:

in step (3):

the conditions of the hot-pressing comprise: a hot-pressing temperature of 115-170° C., a hot-pressing pressure of 2-10 MPa, a preheating time of 5-600s, a hot-pressing time of 1-600s; and/or a pressure for cooling and shaping of 2-8 MPa and a cooling time of 30s-700s; and/or the stacked adjacent polypropylene fabrics are placed at 0-90 degrees with respect to each other along their respective warp directions; and/or the stacked adjacent polypropylene sheets are placed at 0-90 degrees with respect to each other along their respective machine directions.

20. A continuous hot-press molding system for the polypropylene composite material described in claim 1, comprising a preheater, a crawler-type continuous flat hot-press, a crawler-type continuous flat cold-press, a sheet cutting machine and a sheet stacking machine that are sequentially arranged.

21. A consumer good, automobile manufacturing product, sports protection product or military material, comprising the polypropylene composite material described in claim 1.

22. A polypropylene sheet, comprising layer A and layers B and B' located on both sides of layer A, with a structure of BAB';

wherein layer A contains polypropylene composition A, layer B is the same as or different from layer B', layer B contains polypropylene composition B, and layer B' contains polypropylene composition B', and the melting point of the polypropylene composition A is higher than the melting point of the polypropylene composition B and of the polypropylene composition B';

wherein the polypropylene composition A comprises polypropylene homopolymer a and polypropylene impact copolymer b; the polypropylene composition B, the polypropylene composition B' each comprise polypropylene random copolymer x and a thermal bonding enhancer y.

23. The polypropylene sheet according to claim 22, characterized in that:

the polypropylene sheet further comprises layers C, C', with a structure of BCAC'B'; layer C is the same as or different from layer C', layer C contains polypropylene composition C, and layer C' contains polypropylene composition C'; the melting point of the polypropylene composition A is higher than the melting point of the polypropylene composition C and of the polypropylene composition C';

wherein the polypropylene composition C, the polypropylene composition C' each comprise polypropylene random copolymer β and polypropylene homopolymer γ and a thermal bonding enhancer z.

24. The polypropylene sheet according to claim 22, characterized in that:

the polypropylene composition A comprises 50-99 wt % of polypropylene homopolymer a, 1-50 wt % of polypropylene impact copolymer b; and/or the polypropylene composition B, the polypropylene composition B' each comprise 70-99 wt % of polypropylene random copolymer x, 1-30 wt % thermal bonding enhancer y.

25. The polypropylene sheet according to claim 22, characterized in that:

the thickness of the film layer A accounts for 51%-89% of the total thickness, based on the total thickness of the polypropylene sheet.

26. The polypropylene sheet according to claim 23, characterized in that:

the polypropylene composition C, the polypropylene composition C' each comprise 30-60 wt % of thermal bonding enhancer z, 35-55 wt % of polypropylene random copolymer β and 5-15 wt % of polypropylene homopolymer γ.

27. The polypropylene sheet according to claim 23, characterized in that:

the thickness of the layer A accounts for 51%-89% of the total thickness; the thickness of the layers C, C' accounts for 6%-20% of the total thickness; the thickness of the layers B, B' accounts for 5%-30% of the total thickness, based on the total thickness of each polypropylene sheet.

28. The polypropylene sheet according to claim 22, characterized in that:

the polypropylene homopolymer a has:

a melting point of 150-170° C.; and/or a melt flow rate at 230° C., 2.16 kg load of 0.5-50 g/10 min; and/or an isotacticity (mm) not less than 96%; and/or the polypropylene impact copolymer b has a melting point of 150-170° C.; and/or the monomer copolymerized with propylene in the polypropylene impact copolymer b is ethylene or butene; and/or the polypropylene impact copolymer b has a melt flow rate at 230° C. 2.16 kg load of 0.5-50 g/10 min; and/or the polypropylene impact copolymer b has an Izod impact strength no less than 20 $KJ/m^2$; and/or the polypropylene random copolymer x has:

a melting point of 110-150° C.; and/or a melt flow rate at 230° C., 2.16 kg load of 0.5-50 g/10 min; and/or a molecular weight distribution Mw/Mn of 5-12; and/or the polypropylene random copolymer x is a copolymer of propylene with ethylene and/or butene; and/or the thermal bonding enhancer y has:

a melting point or viscous flow temperature of 70-110° C.; and/or a melt flow rate at 190° C., 2.16 kg load of 0.5-50 g/10 min; and/or the thermal bonding enhancer y is selected from one or more of polyolefin elastomer, ethylene-propylene-diene-terpolymer rubber, SEBS, SBS, EVA, petroleum resin.

29. The polypropylene sheet according to claim 23, characterized in that:

the polypropylene homopolymer γ has:

a melting point of 150-170° C.; and/or a melt flow rate at 230° C., 2.16 kg load of 0.5-50 g/10 min; and/or an isotacticity (mm) not less than 96%; and/or the polypropylene random copolymer β has:

a melting point of 110-150° C.; and/or a melt flow rate at 230° C. 2.16 kg load of 0.5-50 g/10 min; and/or a molecular weight distribution Mw/Mn of 5-12; and/or the polypropylene random copolymer β is a copolymer of propylene with ethylene and/or butene; and/or the thermal bonding enhancer z has:

a melting point or viscous flow temperature of 70-110° C.; and/or a melt flow rate at 190° C., 2.16 kg load of 0.5-50 g/10 min; and/or the thermal bonding enhancer z is selected from one or more of polyolefin elastomer, ethylene-propylene-diene-terpolymer rubber, SEBS, SBS, EVA, petroleum resin.

30. The polypropylene sheet according to claim 29, characterized in that:

the polyolefin elastomer is an elastomer of ethylene copolymerized with propylene and/or α-olefin; and/or the petroleum resin is C5 and/or C9 hydrogenated petroleum resin with a softening point of 100-150° C.

31. The polypropylene sheet according to claim 22, characterized in that:

the polypropylene composition A also comprises a β-nucleating agent;

the β-nucleating agent is selected from at least one of polycyclic aromatic hydrocarbons, Group IIA two-component complexes, aromatic diamides, rare earth compounds and cyclic dicarboxylate nucleating agents; and/or the content of the β-nucleating agent in the polypropylene composition A is 0.01-0.5 parts by weight, based on 100 parts by weight of the total amount of the polypropylene composition A.

32. The polypropylene sheet according to claim 22, characterized in that:

the melting point of the polypropylene homopolymer a in the polypropylene composition A is greater than the melting point of the polypropylene random copolymer x in the polypropylene compositions B, B', and the temperature difference between the respective melting points is greater than or equal to 10° C.; and/or the BAB' sheet structure of the polypropylene sheet is obtained by co-extruding the components comprising the polypropylene composition A and the polypropylene compositions B, B'.

33. The polypropylene sheet according to claim 23, characterized in that:

the melting point of the polypropylene homopolymer a in the polypropylene composition A is greater than the melting point of the polypropylene random copolymer x in the polypropylene compositions B, B' and the melting point of the polypropylene random copolymer β in the polypropylene compositions C, C', and the temperature difference between the respective melting points is greater than or equal to 10° C.; and/or the BCAC'B' sheet structure of the polypropylene composite material sheet is obtained by co-extruding the components comprising the polypropylene composition A, the polypropylene compositions B, B' and the polypropylene compositions C, C'.

34. A method for preparing the polypropylene sheet according to claim 22, comprising: polypropylene composition A, polypropylene composition B, polypropylene composition B', optional polypropylene composition C, optional polypropylene composition C' are co-extrusion molded, cast or calendered, and stretched according to BAB' structure or BCAC'B' structure to obtain the polypropylene sheet.

35. The method for preparing the polypropylene composite material sheet according to claim 34, characterized in that, the preparation of the polypropylene composition A comprises melt blending the components comprising the polypropylene homopolymer a and polypropylene impact copolymer b; and/or the preparation of the polypropylene compositions B, B' comprises melt blending the components comprising the polypropylene random copolymer x and thermal bonding enhancer y; and/or the preparation of the polypropylene compositions C, C' comprises melt blending the components comprising the thermal bonding enhancer z, polypropylene random copolymer β and polypropylene homopolymer γ; and/or the temperatures of the co-extrusion molding and casting are independently selected from 200-240° C.; and/or the temperature of the calendering roller is 50-70° C.; and/or the condition of the stretching comprises: the temperature of the stretching of 90-165° C.; the stretching ratio of 1-15.

36. A polypropylene fabric, a three-dimensional polypropylene fabric obtained by weaving the polypropylene sheet according to claim 22;

the polypropylene fabric is obtained by dividing and cutting, and weaving the polypropylene sheet; and/or, the polypropylene fabric has a three-dimensional structure of plain weave, twill weave and/or satin weave.

37. A polypropylene composite material, prepared with multiple layers of polypropylene sheet according to claim 22 and/or the polypropylene fabric by weaving the polypropylene sheet via hot-pressing and fusing;

the polypropylene composite material is prepared with multiple layers of the polypropylene sheets or the polypropylene fabrics via hot-pressing and fusing; and/or the multiple layers of polypropylene sheets are placed and stacked at 0-90 degrees with respect to each other along their respective machine directions from top to bottom; and/or the multiple layers of polypropylene fabrics are placed and stacked at 0-90 degrees with respect to each other along their respective warp directions from top to bottom; and/or the number of the multiple layers of polypropylene sheets and/or the multilayer polypropylene fabrics is greater than or equal to 2 layers.

38. A method for preparing the polypropylene composite material according to claim 37, comprising: the polypropylene sheets and/or the polypropylene fabrics are stacked, hot-pressed and fused, and then cooled and shaped to form the polypropylene composite material.

39. The preparation method according to claim 38, characterized in that:

the temperature of the hot-pressing and fusing is 115-170° C.; and/or the pressure of the hot-pressing and fusing is 2-10 MPa; and/or the preheating time of the hot-pressing and fusing is 5-600s, a hot-pressing time is 1-600s; and/or the pressure for cooling and shaping is 2-8 MPa and the cooling and shaping time is 30s-700s; and/or the number of the stacked layers of the polypropylene sheets and/or the polypropylene fabrics is greater than or equal to 2 layers; and/or the stacked adjacent layers of the polypropylene fabrics are placed at 0-90 degrees with respect to each other along their respective warp directions; and/or the stacked adjacent layers of the polypropylene sheets are placed at 0-90 degrees with respect to each other along their respective machine directions.

40. A sports protection product, automobile manufacturing product, military material or consumer good, comprising the polypropylene sheet described in claim 22.

41. The polypropylene composite material according to claim 1, characterized in that:

the difference between the melting point of polypropylene composition $A_i$ and the melting point of polypropylene composition $B_i$, and the difference between the melting point of polypropylene composition $A_i$ and the melting point of polypropylene composition $B'_i$, are each greater than or equal to 20° C.; and/or the differences between the average value of the melting points of all outer layers in group i and the average value of the melting points of all outer layers in group i–1, same or different, are each 1-5° C.; and/or 2≤n≤50; and/or each of the polypropylene sheet layer unit groups, independently from each other, comprises 1 to 5, same or different polypropylene sheet layer units; and/or the thickness of the core layer $A_i$ in each polypropylene sheet layer unit accounts for 71%-80% of the total thickness, based on the total thickness of each polypropylene sheet layer unit; and/or the polypropylene composition $A_i$ comprises 50-99 wt % of polypropylene homopolymer $a_i$, 1-50 wt % of polypropylene impact copolymer $b_i$, based on the total weight of the polypropylene composition $A_i$; and/or the polypropylene composition $B_i$, the polypropylene composition $B'_i$ each comprise 70-99 wt % of polypropylene random copolymer $x_i$, 1-30 wt % thermal bonding enhancer $y_i$, the polypropylene composition $B'_i$, and/or the polypropylene sheet layer unit is a polypropylene sheet prepared by co-extruding the components comprising polypropylene composition $A_i$, polypropylene composition $B_i$, polypropylene composition $B'_i$, optional polypropylene composition $C_i$, optional polypropylene composition $C'_i$; and/or the polypropylene sheet layer unit is a polypropylene fabric prepared by the following method: firstly, co-extruding the components comprising polypropylene composition $A_i$, polypropylene composition $B_i$, polypropylene composition $B'_i$, optional polypropylene composition $C_i$, optional polypropylene composition $C'_i$ to obtain a polypropylene sheet, and then weaving the polypropylene sheet to obtain the polypropylene fabric.

42. The polypropylene composite material according to claim 8, characterized in that:

the polypropylene composition $A_i$ comprises 70-90 wt % of polypropylene homopolymer $a_i$, 10-30 wt % of polypropylene impact copolymer $b_i$, based on the total weight of the polypropylene composition $A_i$; and/or the polypropylene composition $B_i$, the polypropylene composition $B'_i$ each comprise 80-90 wt % of polypropylene random copolymer $x_i$, 10-20 wt % of thermal bonding enhancer $y_i$, based on the total weight of each of the polypropylene composition $B_i$, the polypropylene composition $B'_i$; and/or the polypropylene homopolymer $a_i$ has:

a melting point of 160-170° C.; and/or a melt flow rate at 230° C., 2.16 kg load of 2.5-18 g/10 min; and/or the monomer copolymerized with propylene in the polypropylene impact copolymer $b_i$ is butene; and/or the polypropylene impact copolymer $b_i$ has a melt flow rate at 230° C., 2.16 kg load of 2.5-18 g/10 min; and/or the polypropylene random copolymer $x_i$ has:

a melting point of 120-140° C.; and/or a melt flow rate at 230° C., 2.16 kg load of 3-18 g/10 min; and/or a molecular weight distribution Mw/Mn of 7-10; and/or the polypropylene random copolymer $x_i$ is an ethylene-propylene-butene terpolymer and/or propylene-ethylene biopolymer, and/or the thermal bonding enhancer $y_i$ has:

a melt flow rate at 190° C., 2.16 kg load of 1-18 g/10 min; and/or the thermal bonding enhancer $y_i$ is a polyolefin elastomer and/or petroleum resin, wherein the polyolefin elastomer is an elastomer of ethylene copolymerized with propylene and/or $\alpha$-olefin, the $\alpha$-olefin is 1-butene and/or 1-octene, and the petroleum resin is cyclopentadiene type resin.

43. The polypropylene composite material according to claim 9, characterized in that:

the polypropylene composition $C_i$, the polypropylene composition $C'_i$ each comprise 30-60 wt % of thermal bonding enhancer $z_i$, 35-55 wt % of polypropylene random copolymer $\beta_i$, and 5-15 wt % of polypropylene homopolymer $\gamma_i$, based on the total weight of each of the polypropylene composition $C_i$, the polypropylene composition $C'_i$; and/or the polypropylene homopolymer $\gamma_i$ has:

a melting point of 160-170° C.; and/or a melt flow rate at 230° C., 2.16 kg load of 2.5-18 g/10 min; and/or the polypropylene homopolymer $a_i$ and the polypropylene homopolymer $\gamma_i$ have:

a difference in melting points less than 10° C.; and/or a difference in melt flow rates at 230° C., 2.16 kg load less than 10 g/10 min; and/or a difference in isotacticities (mm) less than 3%; and/or the polypropylene random copolymer $\beta_i$ has:

a melting point of 120-140° C.; and/or a melt flow rate at 230° C., 2.16 kg load of 3-18 g/10 min; and/or a molecular weight distribution Mw/Mn of 7-10; and/or the polypropylene random copolymer $\beta_i$ is an ethylene-propylene-butene terpolymer and/or propylene-ethylene bipolymer; and/or the polypropylene random copolymer $x_i$ and the polypropylene random copolymer $\beta i$ have:

a difference in melting points less than 10° C.; and/or a difference in melt flow rates at 230° C., 2.16 kg load less than 10 g/10 min; and/or a difference in molecular weight distributions less than 3; and/or the thermal bonding enhancer $z_i$ has:

a melt flow rate at 190° C., 2.16 kg load of 1-18 g/10 min; and/or the thermal bonding enhancer $z_i$ is a polyolefin elastomer and/or petroleum resin, wherein the polyolefin elastomer is an elastomer of ethylene copolymerized with propylene and/or $\alpha$-olefin, the $\alpha$-olefin is 1-butene and/or 1-octene, and the petroleum resin is cyclopentadiene type resin; and/or the thermal bonding enhancer $y_i$ and the thermal bonding enhancer $z_i$ have:

a difference in melting points or viscous flow temperature of less than 10° C.; and/or a difference in melt flow rates at 190° C., 2.16 kg load less than 10 g/10 min.

44. The polypropylene composite material according to claim 9, characterized in that:

the polypropylene composition $C_i$, the polypropylene composition $C'_i$ each comprise 35-55 wt % of thermal bonding enhancer $z_i$, 40-55 wt % of polypropylene random copolymer $\beta_i$, and 5-10 wt % of polypropylene homopolymer $\gamma_i$, based on the total weight of each of the polypropylene composition $C_i$, the polypropylene composition $C'_i$; and/or the polypropylene homopolymer $a_i$ and the polypropylene homopolymer $\gamma_i$ are the same; and/or the polypropylene random copolymer $x_i$ and the polypropylene random copolymer $\beta_i$ are the same; and/or the thermal bonding enhancer $y_i$ and the thermal bonding enhancer $z_i$ are the same.

45. The polypropylene sheet according to claim 22, characterized in that:

the polypropylene composition A comprises 70-90 wt % of polypropylene homopolymer a, 10-30 wt % of polypropylene impact copolymer b, based on the total weight of the polypropylene composition A; and/or the polypropylene composition B, the polypropylene composition B' each comprise 80-90 wt % of polypropylene random copolymer x, 10-20 wt % of thermal bonding enhancer y, based on the total weight of each of the polypropylene composition B, the polypropylene composition B'; and/or the thickness of the film layer A accounts for 71%-80% of the total thickness, based on the total thickness of the polypropylene sheet.

46. The polypropylene sheet according to claim 22, characterized in that:

the polypropylene homopolymer a has:

a melting point of 160-170° C.; and/or a melt flow rate at 230° C., 2.16 kg load of 2.5-18 g/10 min; and/or the monomer copolymerized with propylene in the polypropylene impact copolymer b is butene; and/or the polypropylene impact copolymer b has a melt flow rate at 230° C., 2.16 kg load of 2.5-18 g/10 min; and/or the polypropylene random copolymer x has:

a melting point of 120-140° C.; and/or a melt flow rate at 230° C., 2.16 kg load of 3-18 g/10 min; and/or a molecular weight distribution Mw/Mn of 7-10; and/or the polypropylene random copolymer x is an ethylene-propylene-butene terpolymer and/or propylene-ethylene bipolymer; and/or the thermal bonding enhancer y has:

a melt flow rate at 190° C., 2.16 kg load of 1-18 g/10 min; and/or the thermal bonding enhancer y is a polyolefin elastomer and/or petroleum resin, wherein the polyolefin elastomer is an elastomer of ethylene copolymerized with propylene and/or α-olefin, the α-olefin is 1-butene and/or 1-octene, and the the petroleum resin is cyclopentadiene type resin.

47. The polypropylene sheet according to claim 23, characterized in that:

the polypropylene composition C, the polypropylene composition C' each comprise 35-55 wt % of thermal bonding enhancer z, 40-55 wt % of polypropylene random copolymer β and 5-10 wt % of polypropylene homopolymer γ, based on the total weight of each of the polypropylene composition C, the polypropylene composition C'; and/or the thickness of the layer A accounts for 71%-89% of the total thickness; the thickness of the layers C, C' accounts for 6%-15%; of the total thickness; the thickness of the layers B, B' accounts for 5%-15% of the total thickness, based on the total thickness of each polypropylene sheet; and/or the polypropylene homopolymer γ has:

a melting point of 160-170° C.; and/or a melt flow rate at 230° C., 2.16 kg load of 2.5-18 g/10 min; and/or the polypropylene homopolymer a and the polypropylene homopolymer γ have:

a difference in melting points less than 10° C.; and/or a difference in melt flow rates at 230° C., 2.16 kg load less than 10 g/10 min; and/or a difference in isotacticities (mm) less than 3%; and/or the polypropylene random copolymer β has:

a melting point of 120-140° C.; and/or a melt flow rate at 230° C., 2.16 kg load of 3-18 g/10 min; and/or a molecular weight distribution Mw/Mn of 7-10; and/or the polypropylene random copolymer β is an ethylene-propylene-butene terpolymer and/or propylene-ethylene bipolymer; and/or the polypropylene random copolymer x and the polypropylene random copolymer β have:

a difference in melting points less than 10° C.; and/or a difference in melt flow rates at 230° C., 2.16 kg load less than 10 g/10 min; and/or a difference in molecular weight distributions less than 3; and/or the thermal bonding enhancer z has:

a melt flow rate at 190° C., 2.16 kg load of 1-18 g/10 min; and/or the thermal bonding enhancer z is a polyolefin elastomer and/or petroleum resin, wherein the polyolefin elastomer is an elastomer of ethylene copolymerized with propylene and/or α-olefin, the α-olefin is 1-butene and/or 1-octene, and the the petroleum resin is cyclopentadiene type resin; and/or the petroleum resin the thermal bonding enhancer y and the thermal bonding enhancer z have:

a difference in melting points or viscous flow temperature of less than 10° C.; and/or a difference in melt flow rates at 190° C., 2.16 kg load less than 10 g/10 min.

48. The polypropylene sheet according to claim 23, characterized in that:

the polypropylene homopolymer a and the polypropylene homopolymer γ are the same;

and/or the polypropylene random copolymer x and the polypropylene random copolymer β are the same; and/or the thermal bonding enhancer y and the thermal bonding enhancer z are the same.

* * * * *